US008300794B2

(12) United States Patent
Nakanishi et al.

(10) Patent No.: US 8,300,794 B2
(45) Date of Patent: Oct. 30, 2012

(54) COMMUNICATION CONTROL METHOD, COMMUNICATION SYSTEM AND COMMUNICATION CONTROLLER

(75) Inventors: Ryota Nakanishi, Yokohama (JP); Manabu Fujita, Yokosuka (JP); Seiji Koga, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 767 days.

(21) Appl. No.: 12/423,141

(22) Filed: Apr. 14, 2009

(65) Prior Publication Data
US 2009/0262918 A1    Oct. 22, 2009

(30) Foreign Application Priority Data

Apr. 16, 2008  (JP) ................................ P2008-107116

(51) Int. Cl.
H04M 7/00 (2006.01)
H04M 3/42 (2006.01)
H04M 1/56 (2006.01)
H04M 15/06 (2006.01)

(52) U.S. Cl. ......... 379/220.01; 379/142.01; 379/142.14; 379/201.01; 379/201.11; 379/219

(58) Field of Classification Search ............. 379/220.01, 379/201.11, 201.01, 142.01, 142.14, 219, 379/211.02, 211.01
See application file for complete search history.

(56) References Cited

U.S. PATENT DOCUMENTS
2006/0233351 A1    10/2006 Oshika et al.
2008/0025488 A1    1/2008 Dean et al.
2008/0205617 A1*   8/2008 Sugawara et al. ........ 379/211.02

FOREIGN PATENT DOCUMENTS
EP    1 748 634 A2    1/2007
EP    1 748 634 A3    1/2007
JP    2001-268230     9/2001
JP    2005-57418      3/2005
JP    2008-42588      2/2008

OTHER PUBLICATIONS
Extended European Search Report issued Sep. 27, 2010, in Application No. 09157676.9-2414 / 2111025.

* cited by examiner

Primary Examiner — Thjuan K Addy
(74) Attorney, Agent, or Firm — Oblon, Spivak, McClelland, Maier & Neustadt, L.L.P.

(57) ABSTRACT

The same number is redundantly set as the extension number associated to a fourth telephone number in different data tables associated to different second telephone numbers. For this reason, it is possible to maintain outstanding scalability of the system in a situation where the total number of settable numbers is limited. Further, even if an outgoing call is made to a caller side terminal from a lost receiver side terminal using the call register, the receiver number is recognized to be either an extension number associated to a fourth telephone number or an extension number associated to a fifth telephone number, and an instruction to disconnect a first call is sent to the call controller. As a result, the above-mentioned outgoing call (first call) from the lost receiver side terminal is disconnected, thereby making it possible to fully ensure security when a terminal is lost.

8 Claims, 15 Drawing Sheets

*Fig.2*

| EXTENSION NUMBER ASSOCIATED TO THIRD TELEPHONE NUMBER | SECOND TELEPHONE NUMBER | FIRST TELEPHONE NUMBER | EXTENSION NUMBER ASSOCIATED TO FOURTH TELEPHONE NUMBER |
|---|---|---|---|
| EXTENSION NUMBER 800A ASSOCIATED TO 050-A | 090-A | 090-X | EXTENSION NUMBER 800X ASSOCIATED TO 050-X — 61A |
|  |  | 090-Y | EXTENSION NUMBER 800Y ASSOCIATED TO 050-Y — 61B |
|  |  | 090-Z | EXTENSION NUMBER 800Z ASSOCIATED TO 050-Z — 61C |
| EXTENSION NUMBER 800B ASSOCIATED TO 050-B | 090-B | 090-K | EXTENSION NUMBER 800X ASSOCIATED TO 050-X |
|  |  | 090-L | EXTENSION NUMBER 800Y ASSOCIATED TO 050-Y |
|  |  | 090-M | EXTENSION NUMBER 800Z ASSOCIATED TO 050-Z |
| EXTENSION NUMBER 800C ASSOCIATED TO 050-C | 090-C | 090-N | EXTENSION NUMBER 800X ASSOCIATED TO 050-X |
|  |  | 090-O | EXTENSION NUMBER 800Y ASSOCIATED TO 050-Y |
|  |  | 090-P | EXTENSION NUMBER 800Z ASSOCIATED TO 050-Z |

| FIRST TELEPHONE NUMBER | EXTENSION NUMBER ASSOCIATED TO FOURTH TELEPHONE NUMBER |
|---|---|
| 090-X | EXTENSION NUMBER 800X ASSOCIATED TO 050-X |
| 090-Y | EXTENSION NUMBER 800Y ASSOCIATED TO 050-Y |
| 090-Z | EXTENSION NUMBER 800Z ASSOCIATED TO 050-Z |

*Fig.11*

| FIRST TELEPHONE NUMBER | FOURTH TELEPHONE NUMBER |
|---|---|
| 090-X | 050-X |
| 090-Y | 050-Y |
| 090-Z | 050-Z |

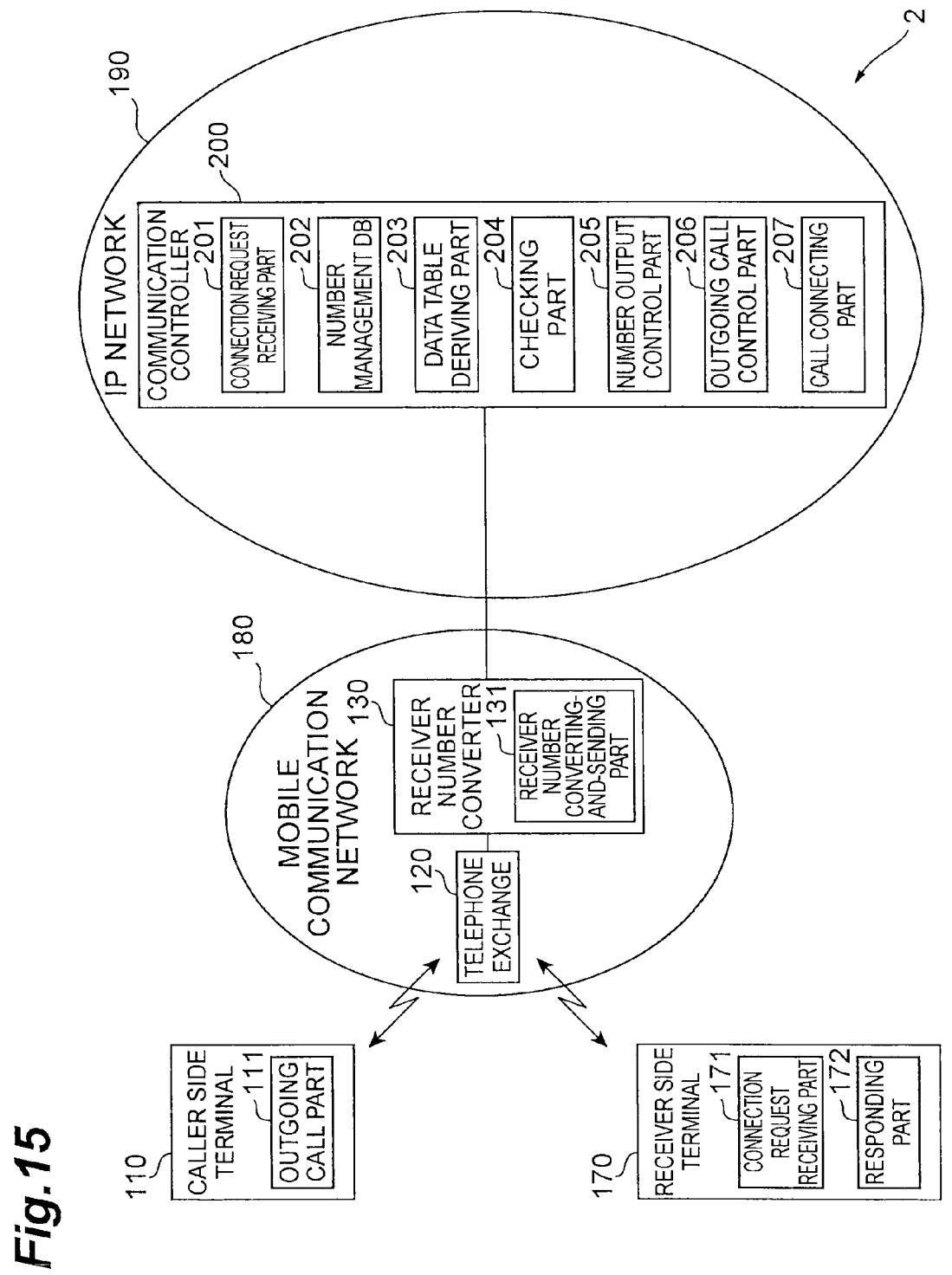

COMMUNICATION CONTROL METHOD, COMMUNICATION SYSTEM AND COMMUNICATION CONTROLLER

BACKGROUND OF THE INVENTION

1. Field of the Invention

The present invention relates to a communication control method, a communication system and a communication controller for using a dummy number to conceal a telephone number.

2. Related Background Art

A system for carrying out a telephone call between a caller terminal and a receiver terminal by concealing either one or both of the telephone number of the caller terminal and the telephone number of the receiver terminal is known (refer to Japanese Patent Application Laid-Open No. 2001-268230, Japanese Patent Application Laid-Open No. 2005-57418, and Japanese Patent Application Laid-Open No. 2008-42588). For example, Japanese Patent Application Laid-Open No. 2001-268230 proposes a system, which has a database for associatively storing at least one of a caller terminal telephone number and a receiver terminal telephone number with a dummy ID, and which makes it possible to select, in accordance with a service code that the caller terminal outputs together with connection destination information, one of three choices: "conceal only the caller number", "conceal only the receiver number" and "conceal both the caller number and the receiver number".

In the system described in Japanese Patent Application Laid-Open No. 2001-268230, several numbers must be issued from the public telephone network for each user, because one dummy ID (telephone number for concealment purposes) is needed per user. However, in actuality, since there is a limit to the total number of numbers capable of being issued from the public telephone network, the above system has room for improvement from the standpoint of scalability.

Meanwhile, Japanese Patent Application Laid-Open No. 2005-57418 proposes a system for registering an association between an actual telephone number and a listed number in a relay system, and concealing the actual number from a caller by forwarding an incoming call to the listed number from the caller to the actual telephone number in the relay system. Japanese Patent Application Laid-Open No. 2008-42588 proposes a system for registering an association between an actual telephone number and a listed number in the relay system, and when a call is being forwarded via the relay system, making it possible to display the calling party on the receiver terminal using the listed number after concealing the calling party's actual telephone number by converting the caller telephone number from the actual telephone number to the listed number.

However, there is room for improvement in the technologies of Japanese Patent Application Laid-Open No. 2005-57418 and Japanese Patent Application Laid-Open No. 2008-42588 from the standpoint of security since a call made to a listed number from the receiver side will be received at the telephone number of the calling party associated to this listed number, and in a case where the called party loses his terminal and a third-party makes a call to the listed number left on the call register of the called party's terminal, this call could be connected to the caller terminal associated to this listed number.

SUMMARY OF THE INVENTION

The present invention is designed to solve for the above problems, and an object of the present invention is to fully ensure security if a terminal is lost while maintaining outstanding scalability of the system.

A communication control method related to the present invention is a communication control method for a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the communication control method comprising: a step, by a caller side terminal, of sending a connection request including a first telephone number and a second telephone number; a step, by a receiver number converter, of receiving the connection request sent from the caller side terminal, converting the second telephone number to a third telephone number, and sending a post-conversion connection request including the first telephone number and the third telephone number; a step, by an extension number converter, of receiving the connection request sent from the receiver number converter, converting the third telephone number to an extension number associated to this third telephone number, and sending a post-conversion connection request including the first telephone number and the extension number associated to the third telephone number; a step, by the call controller, of receiving the connection request sent from the extension number converter as a first call, and sending sending-and-receiving information of the received first call to a number manager to query number information associated to the sending-and-receiving information; a step, by the number manager, of receiving the first call sending-and-receiving information from the call controller, and deriving a second telephone number and a data table associated to this second telephone number by using an extension number associated to a third telephone number included in the first call sending-and-receiving information as a key, the number manager comprising a number management database that associatively stores an extension number associated to a third telephone number and a second telephone number, and a data table comprising a plurality of combinations of a first telephone number and an extension number associated to a fourth telephone number, by using the extension number associated to the third telephone number as a key; a step, by the number manager, of checking the first telephone number with this data table; a step, by the number manager, of sending the second telephone number and an extension number associated to the fourth telephone number to the call controller when the extension number associated to this fourth telephone number, which is associated to the first telephone number, exists in the data table, and of either sending an instruction to disconnect the first call to the call controller or sending, to the call controller, the second telephone number and an extension number associated to a fifth telephone number in accordance with unregistered party reception enabled/disabled setting information for showing reception enabled/disabled to an unregistered party when the extension number associated to the fourth telephone number does not exist in the data table; a step, by the call controller, of disconnecting the first call upon receiving the first call disconnect instruction, and of setting an extension number associated to the fourth telephone number as the caller number, setting the second telephone number as the receiver number and making an outgoing call as a second call upon receiving the second telephone number and the extension number associated to the fourth telephone number, and of setting an extension number associated to the fifth telephone number as the caller number, setting the second telephone number as the receiver number and making an outgoing call as a second call upon receiving the second telephone number and the extension number associated to the fifth telephone number; a step, by the extension number converter, of either converting the extension number associated to a fourth telephone number that has been set as the caller number of this connection request to a fourth telephone number and sending a connection request in which this fourth telephone number is set as the caller number, or converting the extension number associated to a fifth telephone number that has been set as the caller number of this connection request to a fifth telephone number and sending a connection request in which this fifth telephone number is set as the caller number, subsequent to receiving the second call connection request from the call controller; a step, by the receiver side terminal, of receiving the connection request in which either the fourth telephone number or the fifth telephone number is set as the caller number, and the second telephone number is set as the receiver number, from the extension number converter; a step, by the receiver side terminal, of responding to the received connection request; and a step, by the call controller, of connecting the first call and the second call in response to a response from the receiver side terminal, thereby establishing a call connection between the caller side terminal and the receiver side terminal, wherein, when the number manager determines that the receiver number in the sending-and-receiving information of the first call received from the call controller is either an extension number associated to the fourth telephone number or an extension number associated to the fifth telephone number, the number manager sends a first call disconnect instruction to the call controller, and the same number is redundantly set as the extension number associated to the fourth telephone number in different data tables associated to different second telephone numbers.

A communication system related to the present invention is a communication system, which comprises a caller side terminal, a receiver number converter, an extension number converter, a call controller, a number manager, and a receiver side terminal, and which is configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the caller side terminal comprising an outgoing call part for sending a connection request containing a first telephone number and a second telephone number; the receiver number converter comprising a receiver number converting-and-sending part for receiving a connection request sent from the caller side terminal, converting the second telephone number to a third telephone number, and sending a post-conversion connection request containing the first telephone number and the third telephone number; the extension number converter comprising: a converting-and-sending part for receiving the connection request sent from the receiver number converter, converting the third telephone number to an extension number associated to this third telephone number, and sending a post-conversion connection request containing the first telephone number and the extension number associated to the third telephone number; and a reverse converting-and-sending part for, subsequent to receiving the second call connection request from the call controller, either converting the extension number associated to a fourth telephone number that has been set as the caller number of this connection request to the fourth telephone number and sending a connection request in which this fourth telephone number is set as the caller number, or converting the extension number associated to the fifth telephone number that has been set as the caller number of this connection request to the fifth telephone number and sending a connection request in which this fifth telephone number is set as the caller number; the call controller comprising: a number query part for receiving as a first call the connection request sent from the extension number converter and sending sending-and-receiving information of this received first call to the number manager to query number information associated to the sending-and-receiving information; an outgoing call control part for disconnecting the first call upon receiving the first call disconnect instruction, for setting an extension number associated to the fourth telephone number as the caller number, setting the second telephone number as the receiver number and making an outgoing call as a second call upon receiving the second telephone number and the extension number associated to the fourth telephone number, and for setting an extension number associated to the fifth telephone number as the caller number, setting the second telephone number as the receiver number and making an outgoing call as a second call upon receiving the second telephone number and the extension number associated to the fifth telephone number; and a call connecting part for connecting the first call and the second call in response to a response from the receiver side terminal to establish a call connection between the caller side terminal and the receiver side terminal; the number manager comprising: a number management database for associatively storing an extension number associated to a third telephone number and a second telephone number, and a data table comprising a plurality of combinations of a first telephone number and an extension number associated to a fourth telephone number, by using the extension number associated to the third telephone number as a key; a data table deriving part for receiving the first call sending-and-receiving information from the call controller, and deriving a second telephone number and a data table associated to this second telephone number by using the extension number associated to the third telephone number included in the first call sending-and-receiving information as a key; a checking part for checking the first telephone number with this data table; and a number sending control part for sending, to the call controller, the second telephone number and an extension number associated to the fourth telephone number when the extension number associated to this fourth telephone number, which is associated to the first telephone number, exists in the data table, and for either sending an instruction to disconnect the first call to the call controller or sending, to the call controller, the second telephone number and an extension number associated to a fifth telephone number in accordance with unregistered party reception enabled/disabled setting information for showing reception enabled/disabled to an unregistered party when the extension number associated to the fourth telephone number does not exist in the data table; and the receiver side terminal comprising: a connection request receiving part for receiving, from the extension number converter, the connection request in which either the fourth telephone number or the fifth telephone number is set as the caller number, and the second telephone number is set as the receiver number; and a responding part for responding to the received connection request, wherein, when the receiver number in the sending-and-receiving information of the first call received from the call controller is either an extension number associated to the fourth telephone number or an extension number associated to the fifth telephone number, the data table deriving part sends a first call disconnect instruction to the call controller; and the same number is redundantly set as the extension number associated to the fourth telephone number in different data tables associated to different second telephone numbers.

According to the above communication control method and communication system, the same number is redundantly set as the extension number associated to the above-mentioned fourth telephone number in different data tables associated to different second telephone numbers, thereby limiting the total number of settable numbers and making it possible to maintain outstanding scalability of the system. Further, if an outgoing call is made to the caller side terminal from a lost receiver side terminal using the call register, the receiver number is recognized as being either the extension number associated to a fourth telephone number or the extension number associated to a fifth telephone number, a first call disconnect instruction is sent to the call controller, and the above-mentioned outgoing call (first call) to the caller side terminal is disconnected, thereby making it possible to fully ensure security when a terminal is lost.

The call controller and the number manager may be configured by a single communication controller. In this case, the present invention may also be described as an invention related to the communication controller as below, and will demonstrate the same operation and effects.

A communication controller related to the present invention is a communication controller that resides inside a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to its own communication controller, the communication controller comprising: a connection request receiving part for receiving a post-conversion connection request containing the first telephone number and the extension number associated to the third telephone number, subsequent to a second telephone number being converted to a third telephone number by a receiver number converter and the third telephone number being converted to an extension number associated to this third telephone number by an extension number converter relative to a connection request containing a first telephone number and the second telephone number sent from the caller side terminal as a first call; a number management database for associatively storing an extension number associated to a third telephone number and a second telephone number, and a data table comprising a plurality of combinations of a first telephone number and an extension number associated to a fourth telephone number, by using the extension number associated to the third telephone number as a key; a data table deriving part for deriving a second telephone number and a data table associated to this second telephone number by using the extension number associated to the third telephone number included in the post-conversion connection request as a key; a checking part for checking the first telephone number with this data table; a number output control part for outputting the second telephone number and an extension number associated to the fourth telephone number when the extension number associated to this fourth telephone number, which is associated to the first telephone number, exists in the data table, and for either outputting an instruction to disconnect the first call or outputting the second telephone number and an extension number associated to a fifth telephone number in accordance with unregistered party reception enabled/disabled setting information for showing reception enabled/disabled to an unregistered party when the extension number associated to the fourth telephone number does not exist in the data table; an outgoing call control part for disconnecting the first call when the first call disconnect instruction is outputted, for setting an extension number associated to the fourth telephone number as the caller number, setting the second telephone number as the receiver number and making an outgoing call as a second call when the second telephone number and the extension number associated to the fourth telephone number are outputted, and for setting an extension number associated to the fifth telephone number as the caller number, setting the second telephone number as the receiver number and making an outgoing call as a second call when the second telephone number and the extension number associated to the fifth telephone number are outputted; and a call connecting part for connecting the first call and the second call in response to a response from the receiver side terminal to establish a call connection between the caller side terminal and the receiver side terminal, wherein, when the data table deriving part determines that the receiver number in the first call sending-and-receiving information is either the extension number associated to the fourth telephone number or the extension number associated to the fifth telephone number, the data table deriving part outputs a first call disconnect instruction to the outgoing call control part; and the same number is redundantly set as the extension number associated to the fourth telephone number in different data tables associated to different second telephone numbers.

The present invention may also be configured to omit the "extension number converter" and the "operation by the extension number converter", and may be described as follows.

A communication control method related to the present invention is a communication control method for a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the communication control method comprising: a step, by a caller side terminal, of sending a connection request including a first telephone number and a second telephone number; a step, by a receiver number converter, of receiving the connection request sent from the caller side terminal, converting the second telephone number to a third telephone number, and sending a post-conversion connection request including the first telephone number and the third telephone number; a step, by the call controller, of receiving the connection request sent from the receiver number converter as a first call, and sending sending-and-receiving information of the received first call to a number manager to query number information associated to the sending-and-receiving information; a step, by the number manager, of receiving the first call sending-and-receiving information from the call controller, and deriving a second telephone number and a data table associated to this second telephone number by using a third telephone number included in the first call sending-and-receiving information as a key, the number manager comprising a number management database that associatively stores the third telephone number and a second telephone number, and a data table comprising a plurality of combinations of a first telephone number and a fourth telephone number, by using the third telephone number as a key; a step, by the number manager, of checking the first telephone number with this data table; a step, by the number manager, of sending the second telephone number and the fourth telephone number to the call controller when this fourth telephone number, which is associated to the first telephone number, exists in the data table, and of either sending an instruction to disconnect the first call to the call controller or sending, to the call controller, the second telephone number and a fifth telephone number in accordance with unregistered party reception enabled/disabled setting information for showing reception enabled/disabled to an unregistered party when the fourth telephone number does not exist in the data table; a step, by the call controller, of disconnecting the first call upon receiving the first call disconnect instruction, of setting the fourth telephone number as the caller number, setting the second telephone number as the receiver number and making an outgoing call as a second call upon receiving the second telephone number and the fourth telephone number, and of setting the fifth telephone number as the caller number, setting the second telephone number as the receiver number and making an outgoing call as a second call upon receiving the second telephone number and the fifth telephone number; a step, by the receiver side terminal, of receiving the connection request in which either the fourth telephone number or the fifth telephone number is set as the caller number, and the second telephone number is set as the receiver number, from the call controller; a step, by the receiver side terminal, of responding to the received connection request; and a step, by the call controller, of connecting the first call and the second call in response to a response from the receiver side terminal, thereby establishing a call connection between the caller side terminal and the receiver side terminal, wherein, when the number manager determines that the receiver number in the sending-and-receiving information of the first call received from the call controller is either the fourth telephone number or the fifth telephone number, the number manager sends a first call disconnect instruction to the call controller; and the same number is redundantly set as the fourth telephone number in different data tables associated to different second telephone numbers.

Further, a communication system related to the present invention is a communication system, which comprises a caller side terminal, a receiver number converter, a call controller, a number manager, and a receiver side terminal, and which is configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the caller side terminal comprising an outgoing call part for sending a connection request containing a first telephone number and a second telephone number; the receiver number converter comprising a receiver number converting-and-sending part for receiving a connection request sent from the caller side terminal, converting the second telephone number to a third telephone number, and sending a post-conversion connection request containing the first telephone number and the third telephone number; the call controller comprising: a number query part for receiving as a first call the connection request sent from the receiver number converter and sending sending-and-receiving information of this received first call to the number manager to query number information associated to the sending-and-receiving information; an outgoing call control part for disconnecting the first call upon receiving the first call disconnect instruction, for setting the fourth telephone number as the caller number, setting the second telephone number as the receiver number and making an outgoing call as a second call upon receiving the second telephone number and the fourth telephone number, and for setting the fifth telephone number as the caller number, setting the second telephone number as the receiver number and making an outgoing call as a second call upon receiving the second telephone number and the fifth telephone number; and a call connecting part for connecting the first call and the second call in response to a response from the receiver side terminal to establish a call connection between the caller side terminal and the receiver side terminal; the number manager comprising: a number management database for associatively storing a third telephone number and a second telephone number, and a data table comprising a plurality of combinations of a first telephone number and a fourth telephone number, by using the third telephone number as a key; a data table deriving part for receiving the first call sending-and-receiving information from the call controller, and deriving a second telephone number and a data table associated to this second telephone number by using the third telephone number included in the first call sending-and-receiving information as a key; a checking part for checking the first telephone number with this data table; and a number sending control part for sending the second telephone number and the fourth telephone number to the call controller when this fourth telephone number, which is associated to the first telephone number, exists in the data table, and for either sending an instruction to disconnect the first call to the call controller or sending, to the call controller, the second telephone number and a fifth telephone number in accordance with unregistered party reception enabled/disabled setting information for showing reception enabled/disabled to an unregistered party when the fourth telephone number does not exist in the data table; and the receiver side terminal comprising: a connection request receiving part for receiving the connection request in which either the fourth telephone number or the fifth telephone number is set as the caller number, and the second telephone number is set as the receiver number, from the call controller; and a responding part for responding to the received connection request, wherein, when the receiver number in the sending-and-receiving information of the first call received from the call controller is either the fourth telephone number or the fifth telephone number, the data table deriving part sends a first call disconnect instruction to the call controller; and the same number is redundantly set as the fourth telephone number in different data tables associated to different second telephone numbers.

In addition, a communication controller related to the present invention is a communication controller that resides inside a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to its own communication controller, the communication controller comprising: a connection request receiving part for receiving a post-conversion connection request containing a first telephone number and a third telephone number, subsequent to a second telephone number being converted to the third telephone number by a receiver number converter relative to a connection request containing the first telephone number and the second telephone number sent from a caller side terminal as a first call; a number management database for associatively storing a third telephone number, a second telephone number, and a data table comprising a plurality of combinations of a first telephone number and a fourth telephone number by using the third telephone number as a key; a data table deriving part for deriving a second telephone number and a data table associated to this second telephone number by using the third telephone number included in the post-conversion connection request as a key; a checking part for checking the first telephone number with this data table; a number output control part for outputting the second telephone number and the fourth telephone number when this fourth telephone number, which is associated to the first telephone number, exists in the data table, and for either outputting an instruction to disconnect the first call or outputting the second telephone number and a fifth telephone number in accordance with unregistered party reception enabled/disabled setting information for showing reception enabled/disabled to an unregistered party when the fourth telephone number does not exist in the data table; an outgoing call control part for disconnecting the first call when the first call disconnect instruction is outputted, for setting the fourth telephone number as the caller number, setting the second telephone number as the receiver number and making an outgoing call as a second call when the second telephone number and the fourth telephone number are outputted, and for setting the fifth telephone number as the caller number, setting the second telephone number as the receiver number and making an outgoing call as a second call when the second telephone number and the fifth telephone number are outputted; and a call connecting part for connecting the first call and the second call in response to a response from the receiver side terminal to establish a call connection between the caller side terminal and the receiver side terminal, wherein, when the data table deriving part determines that the receiver number in the first call sending-and-receiving information is either the fourth telephone number or the fifth telephone number, the data table deriving part outputs a first call disconnect instruction to the outgoing call control part; and the same number is redundantly set as the fourth telephone number in different data tables associated to different second telephone numbers.

The setting of the above unregistered party reception enabled/disabled setting information can be changed. For this reason, it is possible to set whether or not to disconnect a first call in a case where the extension number associated to the fourth telephone number does not exist.

According to the present invention, it is possible to fully ensure security when a terminal is lost while maintaining outstanding scalability of the system.

BRIEF DESCRIPTION OF THE DRAWINGS

FIG. 2 is a diagram showing the structure and data examples of a number management DB.

FIG. 3 is a diagram showing an example of a derived data table.

FIG. 11 is a diagram showing an example of a derived data table.

FIG. 15 is a configuration diagram of the communication system when the call controller and the number manager of the second embodiment have been configured as a single device.

DESCRIPTION OF THE PREFERRED EMBODIMENTS

Figure 1:
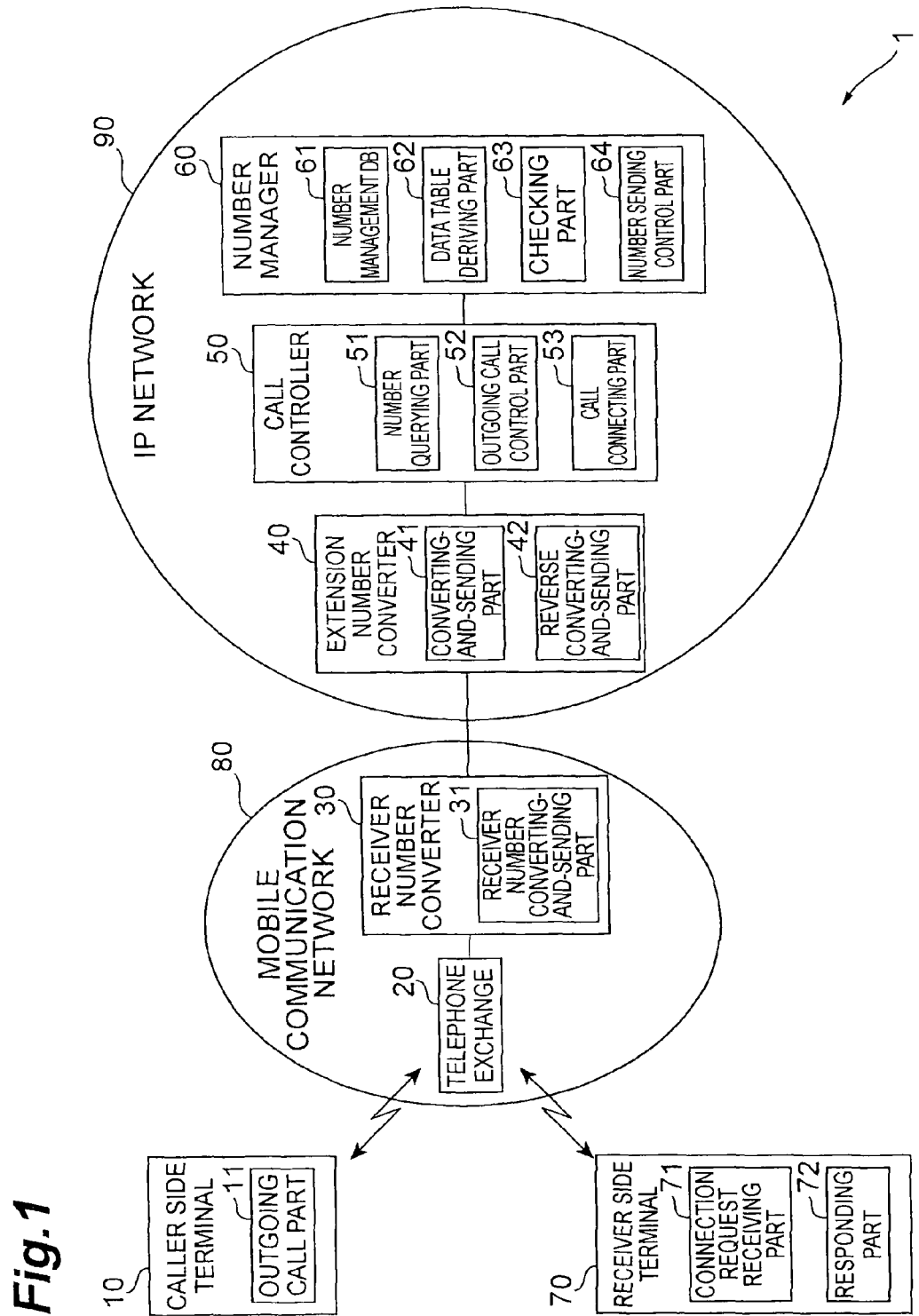
FIG. 1 is a diagram of the configuration of a communication system related to a first embodiment.

Various embodiments related to the present invention will be explained below by referring to the drawings.

First Embodiment (Configuration of Communication System and Respective Devices)

First, the configuration of the communication system related to this embodiment will be explained. As shown in FIG. 1, the communication system 1 related to this embodiment includes a plurality of terminals (caller side terminal 10, receiver side terminal 70), a telephone exchange 20, a receiver number converter 30, an extension number converter 40, a call controller 50, and a number manager 60. Of these devices, the telephone exchange 20 and receiver number converter 30 are disposed inside a mobile communication network 80, and the extension number converter 40, call controller 50 and number manager 60 are disposed inside an IP network 90. The mobile communication network 80 and the IP network 90 are interconnected via a gateway device not shown in the drawing.

In the communication system 1, the configuration is such that there are a first telephone number as the caller number, a second telephone number as the receiver number, a third telephone number that has been pre-associated to a second telephone number, a fourth telephone number as a dummy number that has been pre-associated to the first telephone number, and a fifth telephone number as a dummy number for unregistered party use, and a connection request having any of the third telephone number, the fourth telephone number and the fifth telephone number as the caller number is routed to the call controller 50 inside the IP network 90.

Functional block configurations of the respective devices will be explained below.

The caller side terminal 10 includes an outgoing call part 11 for sending a connection request containing a first telephone number and a second telephone number, and the receiver number converter 30 includes a receiver number converting-and-sending part 31 for receiving the connection request sent from the caller side terminal 10, converting the second telephone number to a third telephone number, and sending a post-conversion connection request containing the first telephone number and the third telephone number.

The extension number converter 40 includes a converting-and-sending part 41 and a reverse converting-and-sending part 42. Of these two devices, the converting-and-sending part 41 receives the connection request sent from the receiver number converter 30, converts the third telephone number to an extension associated to this third telephone number, and sends a post-conversion connection request containing the first telephone number and the third telephone number. The reverse converting-and-sending part 42, subsequent to receiving a connection request of a second call from the call controller 50, either converts an extension number associated to the fourth telephone number set in the calling number of this connection request to a fourth telephone number and sends a connection request in which this fourth telephone number has been set, or converts an extension number associated to a fifth telephone number set in the calling number of this connection request to a fifth telephone number and sends a connection request in which this fifth telephone number has been set.

The call controller 50 includes a number querying part 51, an outgoing call control part 52, and a call connecting part 53. Of these three devices, the call querying part 51 queries number information associated to sending-and-receiving information of a first call by receiving the connection request sent from the extension number converter 40 as the first call and sending the sending-and-receiving information of the received first call, to the number manager 60. The outgoing call control part 52 disconnects the first call upon receiving a first call disconnect instruction, the outgoing call control part 52 sets an extension number associated to a fourth telephone number as the caller number, sets a second telephone number as the receiver number and originates a call as a second call upon receiving the second telephone number and the extension number associated to the fourth telephone number. The outgoing call control part 52 sets an extension number associated to a fifth telephone number as the caller number, sets a second telephone number as the receiver number and originates a call as the second call upon receiving the second telephone number and the extension number associated to the fifth telephone number. The call connecting part 53 connects the first call and the second call in response to a response from the receiver side terminal 70 to establish a call connection between the caller side terminal 10 and the receiver side terminal 70.

The number manager 60 includes a number management database (referred to as the "number management DB" hereinafter) 61, a data table deriving part 62, a checking part 63, and a number sending control part 64. Of these four devices, the number management DB 61, by using an extension number associated to a third telephone number as a key, associatively stores an extension number associated to a third telephone number, a second telephone number, and a data table including a plurality of combinations of first telephone numbers and extension numbers associated to fourth telephone numbers. The data table deriving part 62 receives the sending-and-receiving information of the first call from the call controller 50, and using the extension number associated to the third telephone number included in the sending-and-receiving information of the first call as a key, derives a second telephone number and the data table associated to this second telephone number. The checking part 63 checks the first telephone number with this data table. The number sending control part 64 sends to the call controller 50 a second telephone number and an extension number associated to a fourth telephone number when the extension number associated to this fourth telephone number, which is associated to the first telephone number, exists in the data table. The checking part 63 either sends to the call controller 50 a first call disconnect instruction or sends to the call controller 50 a second telephone number and an extension number associated to a fifth telephone number in accordance with unregistered party reception enabled/disabled setting information for showing reception enabled/disabled to an unregistered party when the extension number associated to the fourth telephone number does not exist in the data table.

Furthermore, although omitted from the drawing, the number management DB 61 stores the above unregistered party reception enabled/disabled setting information for each user, and the setting of this unregistered party reception enabled/disabled setting information can be changed in accordance with the user. The number sending control part 64 references the above unregistered party reception enabled/disabled setting information to carry out the control operations described hereinabove. Further, a fifth telephone number 050-S as a dummy ID for unregistered party use and an extension number 800S associated to the fifth telephone number 050-S are stored in the number management DB 61.

The receiver side terminal 70 includes a connection request receiving part 71 for receiving, from the extension number converter 40, a connection request in which either a fourth telephone number or a fifth telephone number is set as the caller number, and a second telephone number is set as the receiver number, and a responding part 72 for responding to a received connection request.

Of the above described devices, the data table deriving part 62 of the number manager 60 has a function for sending a first call disconnect instruction to the call controller 50 when the receiver number in the sending-and-receiving information of the first call received from the call controller 50 is either an extension number associated to a fourth telephone number or an extension number associated to a fifth telephone number.

Further, in the number management DB 61, the same number is redundantly set as the extension number associated to the fourth telephone number in different data tables associated to different second telephone numbers.

Specifically, in the number management DB 61 shown in FIG. 2, the same extension numbers 800X, 800Y, 800Z are redundantly set as the extension numbers associated to the fourth telephone number in three different data tables, i.e. data table 61A associated to second telephone number "090-A", data table 61B associated to second telephone number "090-B", and data table 61C associated to second telephone number "090-C".

Figure 7:
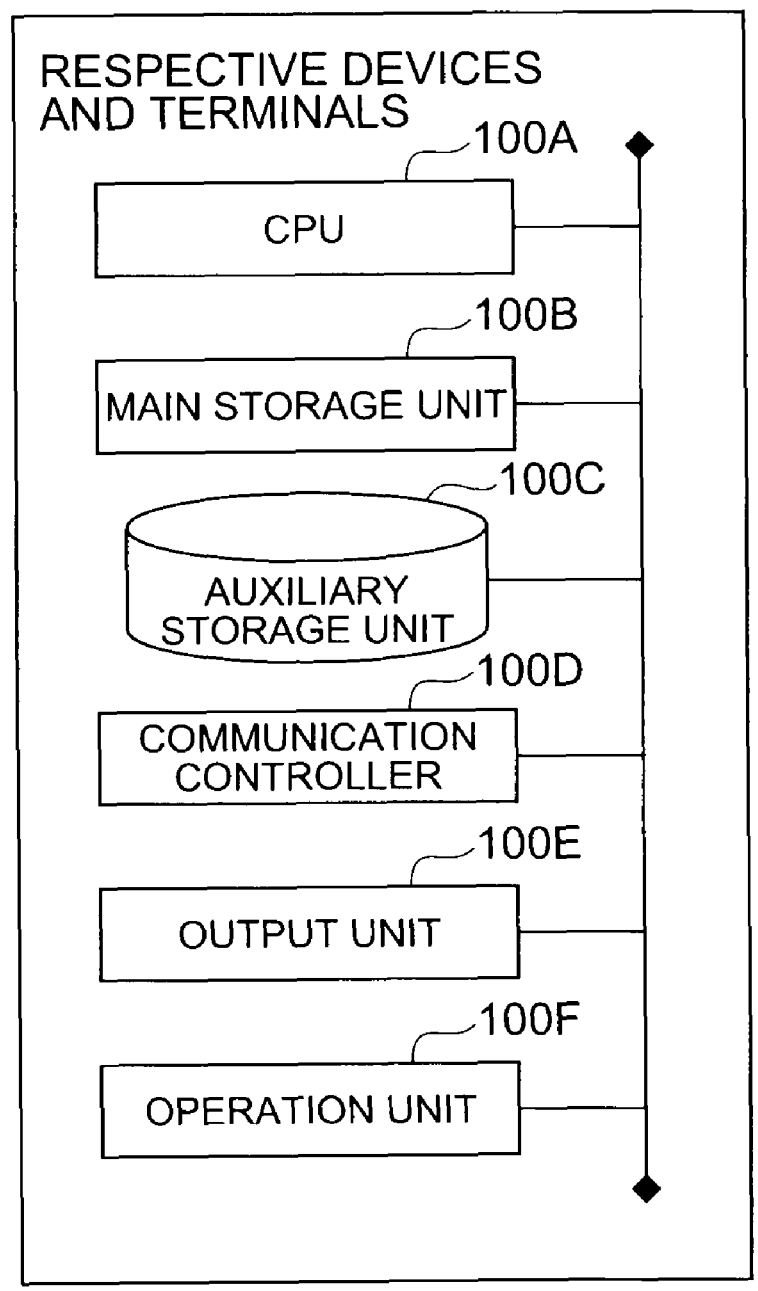
FIG. 7 is a hardware configuration diagram of the respective devices and terminals of the first embodiment and a second embodiment.

Now then, as shown in FIG. 7, for example, in terms of hardware, the respective devices and terminals of FIG. 1 include a CPU 100A for executing an operating system, an application program or the like, a main storage unit 100B configured by ROM and RAM, an auxiliary storage unit 100C configured by a nonvolatile memory, a communication controller 100D for carrying out data communications, an output unit 100E for carrying out an information display or an information printout, and an operation unit 100F configured by keys for inputting alphanumeric characters and issuing execution instructions. Furthermore, the respective functions illustrated in FIG. 1 are realized by the CPU 100A and main storage unit 100B shown in FIG. 7 reading in a predetermined software program and executing a predetermined application, and operating the communication controller 100D under the control of the CPU 100A to carry out a data read and write from and to the main storage unit 100B and the auxiliary storage unit 100C.

(Processing Flow of This Embodiment)

Figure 5:
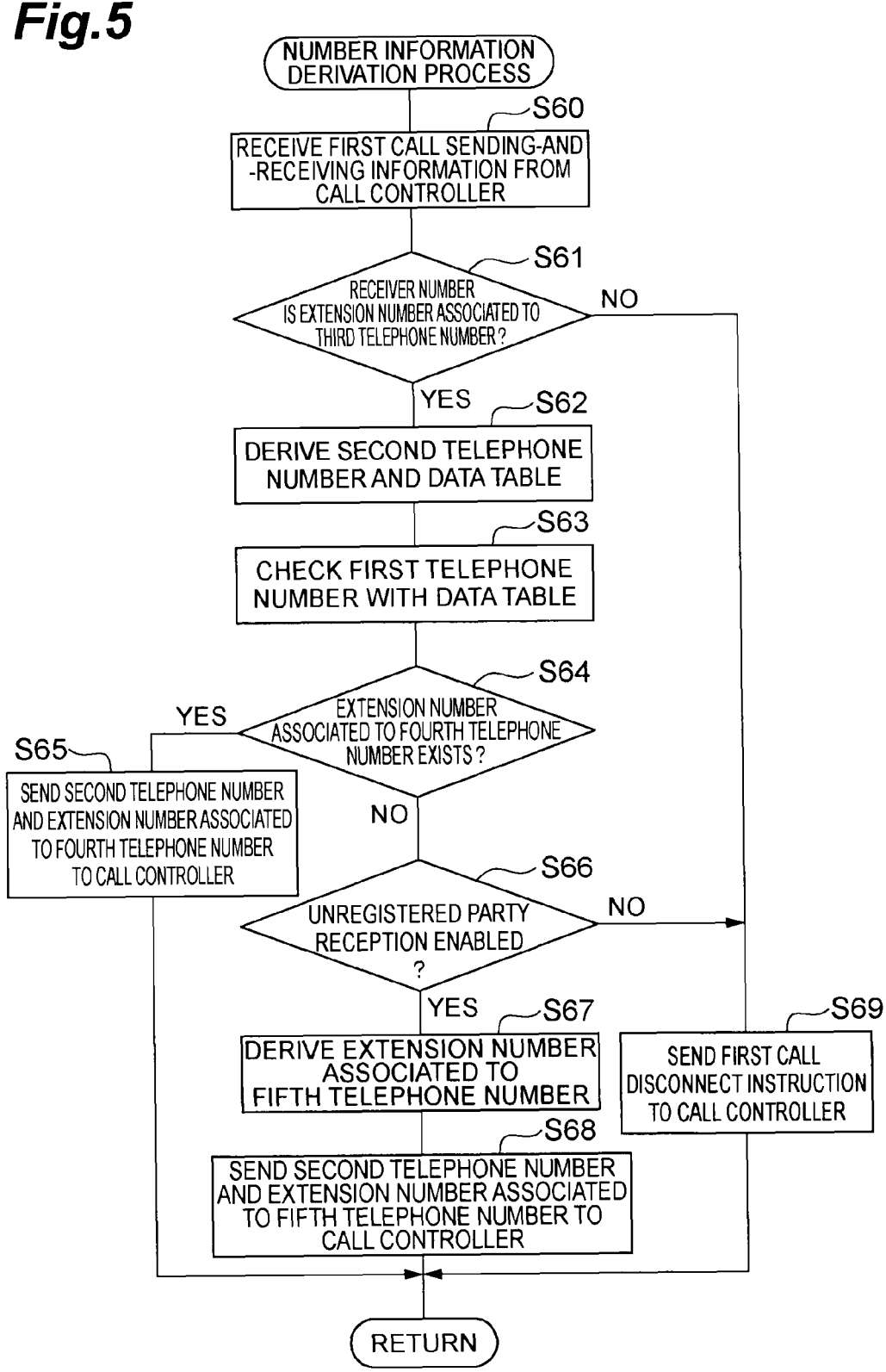
FIG. 5 is a flowchart showing a subroutine of a process for deriving number information.
Figure 6:
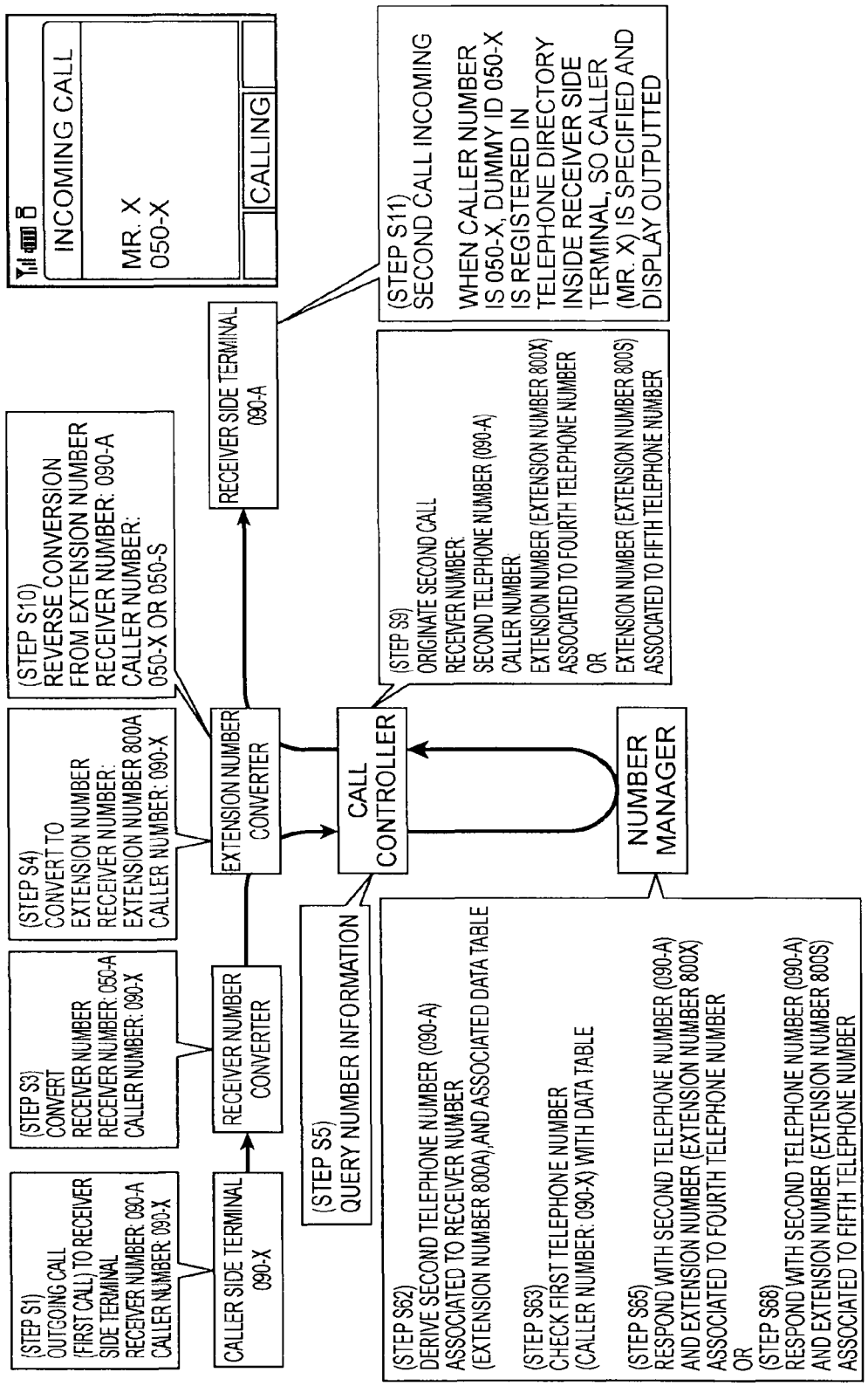
FIG. 6 is a diagram for illustrating the processing of FIG. 4.

The flow of processing executed in the communication system 1 of FIG. 1 will be explained below using FIGS. 4, 5 and 6. Specific examples of the respective telephone numbers will be explained using FIGS. 2, 3 and 6.

Figure 4:
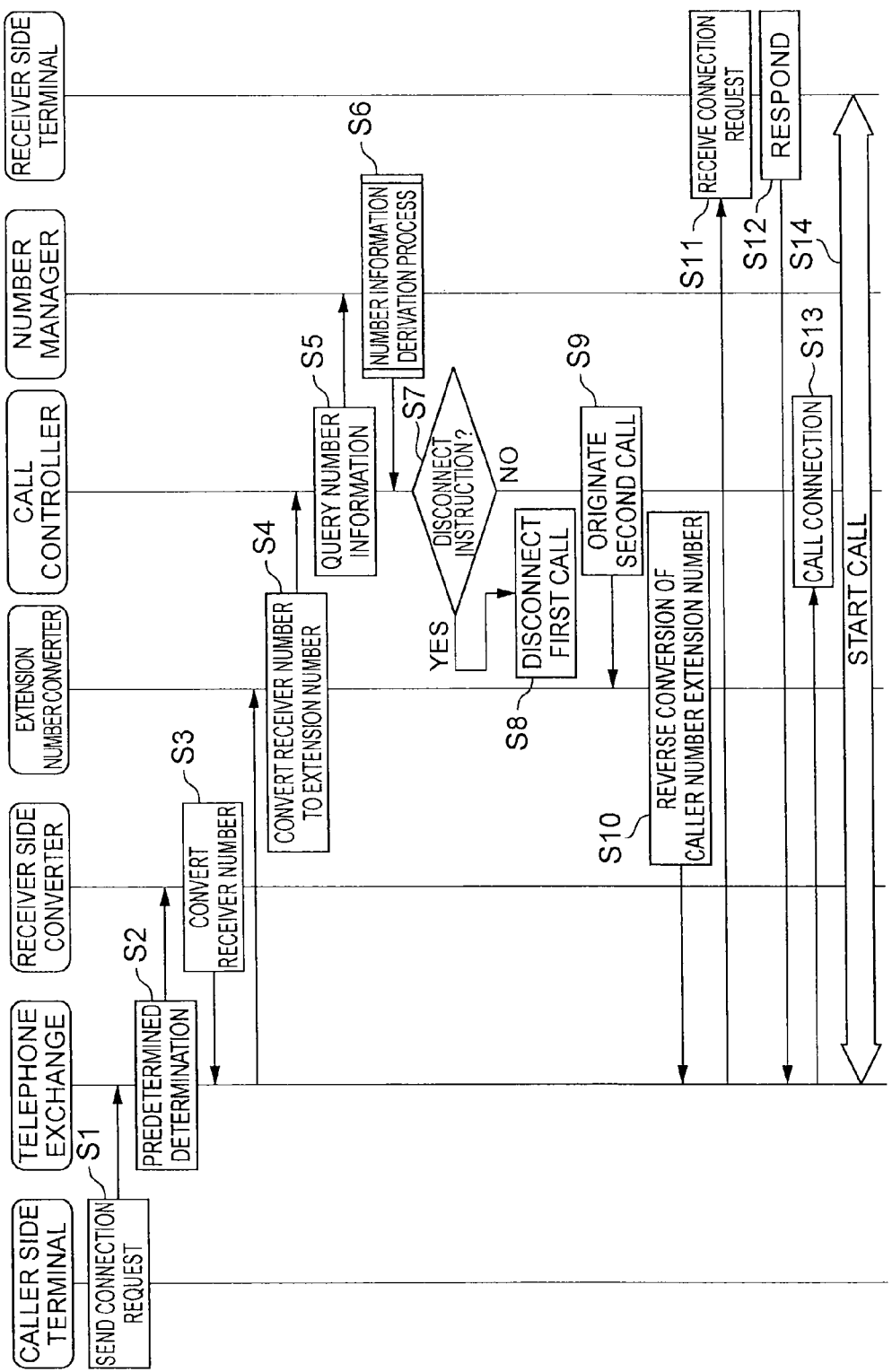
FIG. 4 is a flowchart showing the processing of the first embodiment.

First, the outgoing call part 11 of the caller side terminal 10 sends a connection request containing a first telephone number (090-X) as the caller number and a second telephone number (090-A) as the receiver number (Step S1 of FIG. 4). Then, the telephone exchange 20 nearest to the caller side terminal 10 executes a predetermined determination process for determining whether or not the receiver number (second telephone number: 090-A) is targeted for a conversion process by the receiver number converter 30 (Step S2). In this embodiment, it is supposed that the telephone number of the receiver side terminal 70 (second telephone number: 090-A) is the target of a conversion process by the receiver number converter 30. For this reason, the determination in Step S2 is that the receiver number is targeted for a conversion process by the receiver number converter 30, and the connection request from the caller side terminal 10 is transferred to the receiver number converter 30.

In the receiver number converter 30, the receiver number converting-and-sending part 31 receives the connection request from the caller side terminal 10, converts the second telephone number (090-A) to a third telephone number (050-A), and sends the post-conversion connection request containing the first telephone number (090-X) and the third telephone number (050-A) (Step S3). The post-conversion connection request is transferred to the extension number converter 40 inside the IP network 90 by way of a gateway not shown in the drawing.

In the extension number converter 40, the converting-and-sending part 41 receives the connection request sent from the receiver number converter 30, converts the third telephone number (050-A) to the extension number (extension number 800A) associated to this third telephone number, and sends the post-conversion connection request containing the first telephone number (090-X) and the extension number associated to the third telephone number (extension 800A) (Step S4).

In the call controller 50, the number querying part 51 receives the connection request transferred from the extension number converter 40 as a first call, and sends the received first call sending-and-receiving information to the number manager 60 to query number information associated to the sending-and-receiving information (Step S5).

In the number manager 60, the execution of a number information derivation process (FIG. 5) is commenced upon receiving the above query. First, the data table deriving part 62 receives the above first call sending-and-receiving information from the call controller 50 (Step S60 of FIG. 5), and confirms that the receiver number included in the sending-and-receiving information is the extension number (extension number 800A) associated to the third telephone number (Step S61). At this point, if the receiver number is not the extension number (extension number 800A) associated to the third telephone number, the data table deriving part 62 sends a first call disconnect instruction to disconnect the first call, to the call controller 50 (Step S69). As a case like this in which the receiver number is not the extension number (extension number 800A) associated to the third telephone number, a case is assumed in which the receiver number is either an extension number (extension number 800X) associated to a fourth telephone number or an extension number (extension number 800S) associated to a fifth telephone number, that is, a case in which a call is made to the caller side terminal from a lost receiver side terminal using the call register. Specifically, if an outgoing call is made to the caller side terminal from a lost receiver side terminal using the call register, the data table deriving part 62 recognizes that the receiver number is either the extension number (extension number 800X) associated to the fourth telephone number or the extension number (extension number 800S) associated to the fifth telephone number, and a first call disconnect instruction is sent to the call controller. Therefore the above-mentioned outgoing call (first call) to the caller side terminal is disconnected, thereby making it possible to fully ensure security if a terminal is lost.

Conversely, when the receiver number has been confirmed to be the extension number (extension number 800A) associated to the third telephone number in Step S61, the data table deriving part 62, using the extension number (extension number 800A) associated to the third telephone number included in the sending-and-receiving information as a key, derives the second telephone number (090-A) and the data table associated to this second telephone number (Step S62). A data table including a plurality of combinations of a first telephone number and an extension number associated to a fourth telephone number shown in FIG. 3 is derived here as the data table associated to the second telephone number (090-A) in the number management DB 61 of FIG. 2.

Then, the checking part 63 checks the first telephone number (090-X) with the above data table (Step S63), and determines whether or not the "extension number (extension number 800X) associated to the fourth telephone number", which is associated to the first telephone number (090-X), exists in the data table (Step S64).

When the extension number (extension number 800X) associated to the fourth telephone number exists in the data table, the number sending control part 64 sends the second telephone number (090-A) and the extension number (extension number 800X) associated to the fourth telephone number, to the call controller 50 (Step S65). Conversely, when the extension number (extension number 800X) associated to the fourth telephone number does not exist in the data table in Step S64, the number sending control part 64 refers to preset unregistered party reception enabled/disabled setting information, and if the setting is reception disabled to unregistered party, sends a first call disconnect instruction to disconnect the first call, to the call controller 50 (Step S69). On the other hand, if the setting is reception enabled to unregistered party, the number sending control part 64 derives the "extension number (extension number 800S) associated to the fifth telephone number (050-S)" as the dummy number for unregistered party use (Step S67), and sends the second telephone number (090-A) and the extension number (extension number 800S) associated to the fifth telephone number, to the call controller 50 (Step S68).

In accordance with the above number information derivation process (FIG. 5), any one of (1) a first call disconnect instruction, (2) a second telephone number (090-A) and extension number (extension number 800X) associated to the fourth telephone number, and (3) a second telephone number (090-A) and extension number (extension number 800S) associated to the fifth telephone number is sent from the number manager 60 to the call controller 50.

Returning to FIG. 4, the outgoing call control part 52 of the call controller 50 determines whether or not a first call disconnect instruction has been received from the number manager 60 (Step S7), and when the determination is that a first call disconnect instruction has been received, the outgoing call control part 52 disconnects the first call (Step S8). Conversely, when the determination in Step S7 is negative, the outgoing call control part 52 originates a second call as follows by using the received telephone number (Step S9). That is, when the second telephone number (090-A) and extension number (extension number 800X) associated to the fourth telephone number have been received, the outgoing call control part 52 sets the extension number (extension number 800X) associated to the fourth telephone number as the caller number, sets the second telephone number (090-A) as the receiver number and originates a call as a second call. On the other hand, when the second telephone number (090-A) and extension number (extension number 800S) associated to the fifth telephone number have been received, the outgoing call control part 52 sets the extension number (extension number 800S) associated to the fifth telephone number as the caller number, sets the second telephone number (090-A) as the receiver number and originates a call as a second call.

The above second call is transferred to the extension number converter 40, and subsequent to receiving the second call connection request from the call controller 50, the reverse converting-and-sending part 42 of the extension number converter 40 either reverse converts the extension number (extension number 800X) associated to the fourth telephone number set in the caller number of this connection request to the fourth telephone number (050-X) and sends a connection request in which this fourth telephone number (050-X) is set as the caller number, or reverse converts the extension number (extension number 800S) associated to the fifth telephone number set as the caller number of this connection request to the fifth telephone number (050-S) and sends a connection request in which this fifth telephone number (050-S) is set as the caller number (Step S10). Thereafter, the second call is transferred to the telephone exchange 20 inside the mobile communication network 80 by way of a not-shown gateway, and is routed to the receiver side terminal 70.

The connection request receiving part 71 of the receiver side terminal 70 receives, from the extension number converter 40, a connection request in which either the fourth telephone number (050-X) or the fifth telephone number (050-S) is set as the caller number, and the second telephone number (090-A) is set as the receiver number (Step S11). If, for example, a connection request in which the fourth telephone number (050-X), which is a dummy ID for registered party use, is set as the caller number, and the second telephone number (090-A) is set as the receiver number, is received here, and the fourth telephone number (050-X), i.e. the dummy ID for registered party use, is already registered in the telephone directory inside the receiver side terminal 70, the caller (Mr. X) associated to this fourth telephone number (050-X) is specified, and the caller's name (Mr. X) and calling number (050-X) are outputted and displayed on the receiver side terminal 70 as shown in FIG. 6. The caller number outputted and displayed at this time is not the actual caller number (090-X) of the caller side terminal, but rather the dummy ID fourth telephone number (050-X).

Then, when the user of the receiver side terminal 70 responds, the responding part 72 responds to the call controller 50 (for example, sends a predetermined response signal to the call controller 50) (Step S12).

Then, upon detecting the response from the receiver side terminal 70, the call connecting part 53 of the call controller 50 connects the first call and the second call, and establishes a call connection between the caller side terminal 10 and the receiver side terminal 70 (Step S13). Consequently, a call is started between the caller side terminal 10 and the receiver side terminal 70 (Step S14).

In the above communication system of this embodiment, as described hereinabove, even if a call is made from a lost receiver side terminal to the caller side terminal using the call register, the receiver number is recognized as either an extension number associated to a fourth telephone number or an extension number associated to a fifth telephone number, and a first call disconnect instruction is sent to the call controller. For this reason, the above call (first call) made to the caller side terminal is disconnected, thereby making it possible to fully ensure security if the terminal is lost.

Further, in the number management DB 61, the same number is redundantly set as the extension number associated to the fourth telephone number in different data tables associated to different second telephone numbers. For this reason, it is possible to maintain outstanding scalability of the system in a situation where the total number of settable numbers is limited.

(Sending-and-Receiving Controller and Number Manager Configured as Single Device)

The call controller 50 and number manager 60 of the first embodiment may be configured in accordance with a single communication controller. The configuration of the communication controller in this case will be summarized hereinbelow.

Figure 8:
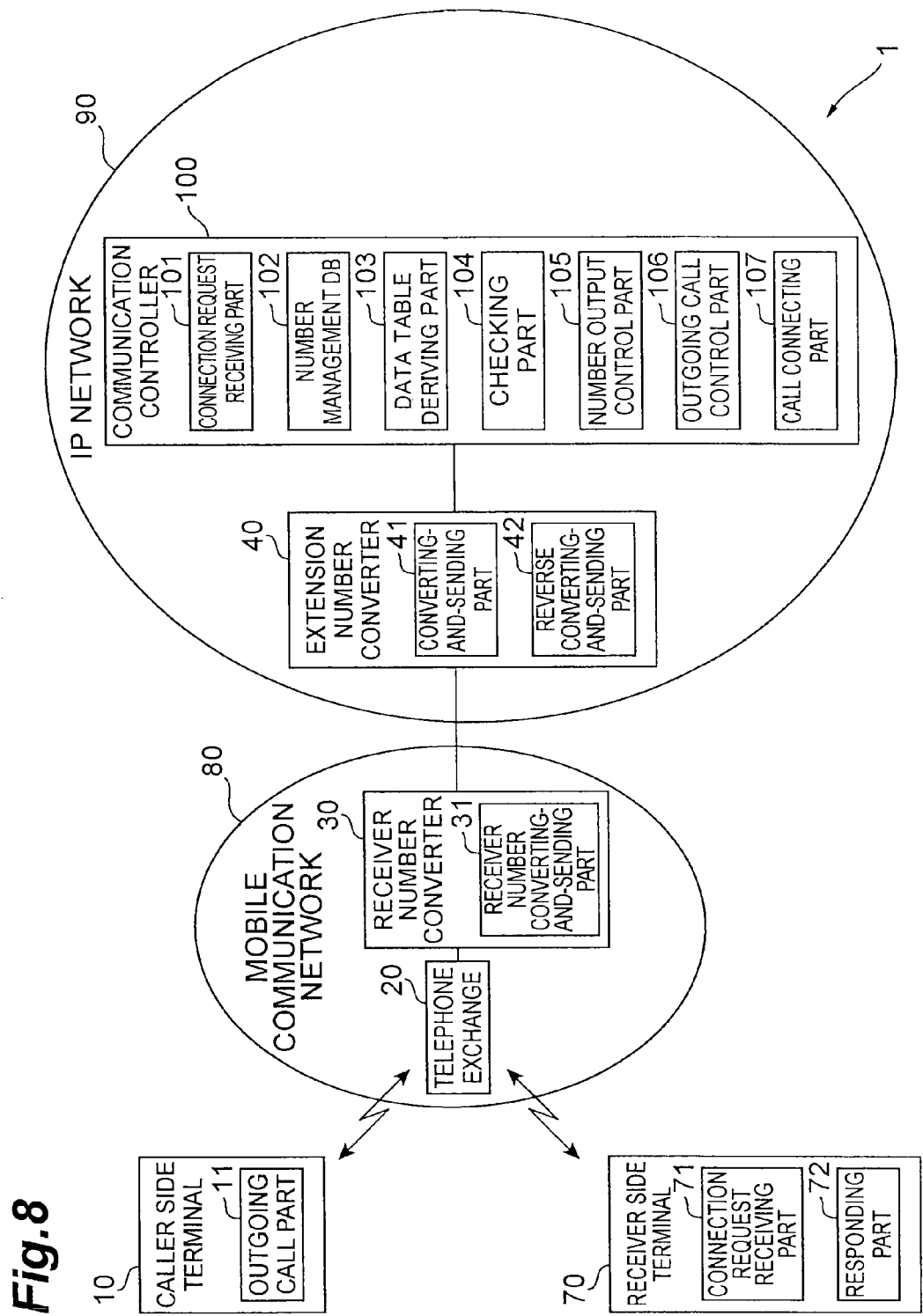
FIG. 8 is a configuration diagram of the communication system when the call controller and the number manager of the first embodiment are configured as a single device.

As shown in FIG. 8, a communication controller 100 that integrates the call controller 50 and the number manager 60 of FIG. 1 is disposed inside the IP network 90 of communication system 1. The functional block configuration of this communication controller 100, for example, may be configured as follows. That is, the communication controller 100 includes a connection request receiving part 101, a number management DB 102, a data table deriving part 103, a checking part 104, a number output control part 105, an outgoing call control part 106, and a call connecting part 107. The functions of the respective components are as follows.

Subsequent to a second telephone number being converted to a third telephone number by the receiver number converter and the third telephone number being converted to an extension number associated to the third telephone number by the extension number converter relative to a connection request containing a first telephone number and the second telephone number having been sent from the caller side terminal as a first call, the connection request receiving part 101 receives a post-conversion connection request containing the first telephone number and the extension number associated to the third telephone number.

The number management DB 102, by using the extension number associated to the third telephone number as a key, associatively stores an extension number associated to a third telephone number, a second telephone number, and a data table including a plurality of combinations of a first telephone number and an extension number associated to a fourth telephone number. The configuration is the same as that of the number management DB shown in FIGS. 1 and 2.

The data table deriving part 103, by using the extension number associated to the third telephone number included in the post-conversion connection request as a key, derives the second telephone number and the data table associated to this second telephone number. This data table deriving part 103 has the same function as that of the data table deriving part 62 of FIG. 1.

The checking part 104 checks the first telephone number with the above data table the same as the checking part 63 of FIG. 1.

The number output control part 105 outputs the second telephone number and the extension number associated to the fourth telephone number when the extension number associated to this fourth telephone number, which is associated to the first telephone number, exists in the above data table. The number output control part 105 either outputs a first call disconnect instruction or outputs the second telephone number and an extension number associated to a fifth telephone number in accordance with unregistered party reception enabled/disabled setting information for showing reception enabled/disabled to an unregistered party when the extension number associated to the fourth telephone number does not exist in the above data table.

The outgoing call control part 106 disconnects the first call when a first call disconnect instruction has been outputted, sets the extension associated to the fourth telephone number as the caller number, sets the second telephone number as the receiver number and makes an outgoing call as a second call when the second telephone number and the extension of the fourth telephone number have been outputted. The outgoing call control part 106 sets the extension associated to the fifth telephone number as the caller number, sets the second telephone number as the receiver number and makes an outgoing call as the second call when the second telephone number and the extension number associated to the fifth telephone number have been outputted.

The call connecting part 107 connects the first call and the second call in response to a response from the receiver side terminal, and establishes a call connection between the caller side terminal and the receiver side terminal, as the same way by the call connecting part 53 of FIG. 1.

This communication controller 100 is configured such that, when a determination has been made that the receiver number in the sending-and-receiving information of the first call is either an extension number associated to a fourth telephone number or an extension number associated to a fifth telephone number, the data table deriving part 103 outputs a first call disconnect instruction to the call controller. Consequently, even if a call is made to the caller side terminal from a lost receiver side terminal using the call register, the data table deriving part 103 recognizes that the receiver number is either an extension number associated to a fourth telephone number or an extension number associated to a fifth telephone number, and sends a first call disconnect instruction to the call controller. For this reason, the above-mentioned outgoing call (first call) to the caller side terminal is disconnected, thereby making it possible to fully ensure security if the terminal is lost.

Further, in the number management DB 102, the same number is redundantly set as the extension number associated to the fourth telephone number in different data tables associated to different second telephone numbers. For this reason, it is possible to maintain outstanding scalability of the system in a situation where the total number of settable numbers is limited.

Second Embodiment (Configurations of Communication System and Respective Devices)

Figure 9:
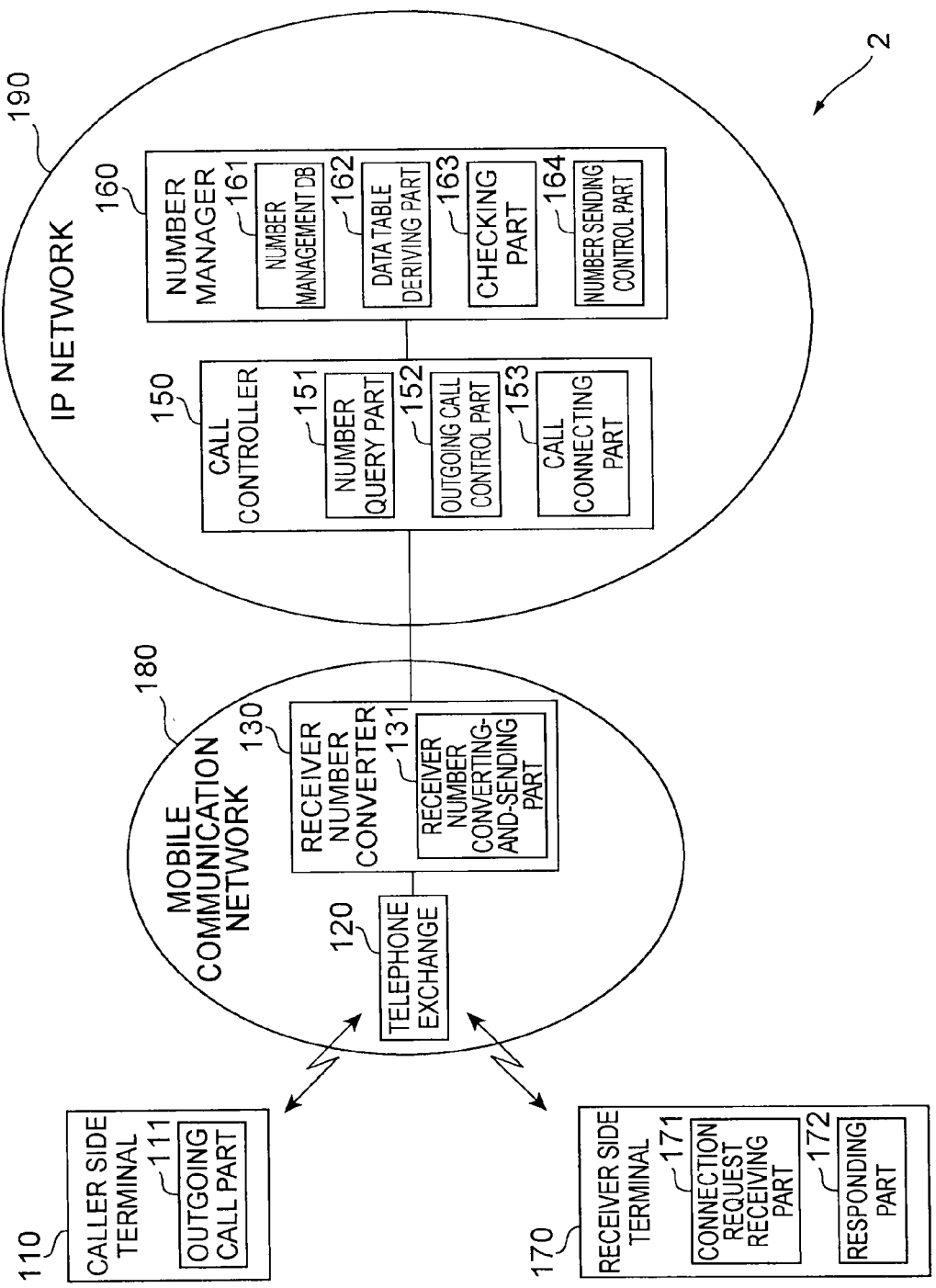
FIG. 9 is a configuration diagram of the communication system related to the second embodiment.

First, the configuration of the communication system related to this embodiment will be explained. As shown in FIG. 9, the communication system 2 related to this embodiment includes a plurality of terminals (a caller side terminal 110 and a receiver side terminal 170), a telephone exchange 120, a called party number converter 130, a call controller 150, and a number manager 160. Of these devices, the telephone exchange 120 and receiver number converter 130 are disposed inside a mobile communication network 180, and the call controller 150 and number manager 160 are disposed inside an IP network 190. The mobile communication network 180 and the IP network 190 are interconnected via a gateway device not shown in the drawing.

In the communication system 2, the configuration is such that there are a first telephone number as the caller number, a second telephone number as the receiver number, a third telephone number that has been pre-associated to the second telephone number, a fourth telephone number as a dummy number that has been pre-associated to the first telephone number, and a fifth telephone number as a dummy number for unregistered party use, and a connection request having any of the third telephone number, the fourth telephone number and the fifth telephone number as the caller number is routed to the call controller 150 inside the IP network 190.

Functional block configurations of the respective devices will be explained below.

The caller side terminal 110 includes an outgoing call part 111 for sending a connection request containing a first telephone number and a second telephone number, and the receiver number converter 130 includes a receiver number converting-and-sending part 131 for receiving the connection request sent from the caller side terminal 110, converting the second telephone number to a third telephone number, and sending the post-conversion connection request containing the first telephone number and the third telephone number.

The call controller 150 includes a number querying part 151, an outgoing call control part 152, and a call connecting part 153. Of these three devices, the call querying part 151 receives, as a first call, the connection request sent from the receiver number converter 130, and sends the received first call sending-and-receiving information to the number manager 160 to query number information associated to the sending-and-receiving information. The outgoing call control part 152 disconnects the first call upon receiving a first call disconnect instruction, sets a fourth telephone number as the caller number, sets a second telephone number as the receiver number and makes an outgoing call as a second call upon receiving the second telephone number and the fourth telephone number. The outgoing call control part 152 sets a fifth telephone number as the caller number, sets a second telephone number as the receiver number and makes an outgoing call as a second call upon receiving the second telephone number and the fifth telephone number. The call connecting part 153 connects the first call and the second call in response to a response from the receiver side terminal 170 to establish a call connection between the caller side terminal 110 and the receiver side terminal 170.

The number manager 160 includes a number management DB 161, a data table deriving part 162, a checking part 163, and a number sending control part 164. Of these four devices, the number management DB 161, using the third telephone number as a key, associatively stores a third telephone number and a second telephone number, and a data table including a plurality of combinations of a first telephone number and a fourth telephone number. The data table deriving part 162 receives the sending-and-receiving information of the first call from the call controller 150, and using the third telephone number included in the sending-and-receiving information of the first call as a key, derives the second telephone number and the data table associated to this second telephone number. The checking part 163 checks the first telephone number with this data table. The number sending control part 164 sends the second telephone number and the fourth telephone number to the call controller 150 when the fourth telephone number, which is associated to the first telephone number, exists in the above data table. The number sending control part 164 either sends a first call disconnect instruction or sends to the call controller 150 the second telephone number and a fifth telephone number in accordance with unregistered party reception enabled/disabled setting information for showing reception enabled/disabled to an unregistered party, to the call controller 150 when the fourth telephone number does not exist in the above data table.

Furthermore, although omitted from the drawing, the number management DB 161 stores the above unregistered party reception enabled/disabled setting information for each user, and the setting of this unregistered party reception enabled/disabled setting information can be changed in accordance with the user. The number sending control part 164 references the above unregistered party reception enabled/disabled setting information to carry out the control operations described hereinabove. Further, a fifth telephone number 050-S as a dummy ID for unregistered party use is stored in the number management DB 161.

The receiver side terminal 170 includes a connection request receiving part 171 for receiving, from the call controller 150, a connection request in which either a fourth telephone number or a fifth telephone number is set as the caller number, and a second telephone number is set as the receiver number, and a responding part 172 for responding to a received connection request.

Of the above described devices, the data table deriving part 162 of the number manager 160 has a function for sending a first call disconnect instruction to the call controller 150 when the receiver number in the sending-and-receiving information of the first call received from the call controller 150 is either a fourth telephone number or a fifth telephone number.

Further, in the number management DB 161, the same number is redundantly set as the fourth telephone number in different data tables associated to different second telephone numbers.

Figure 10:
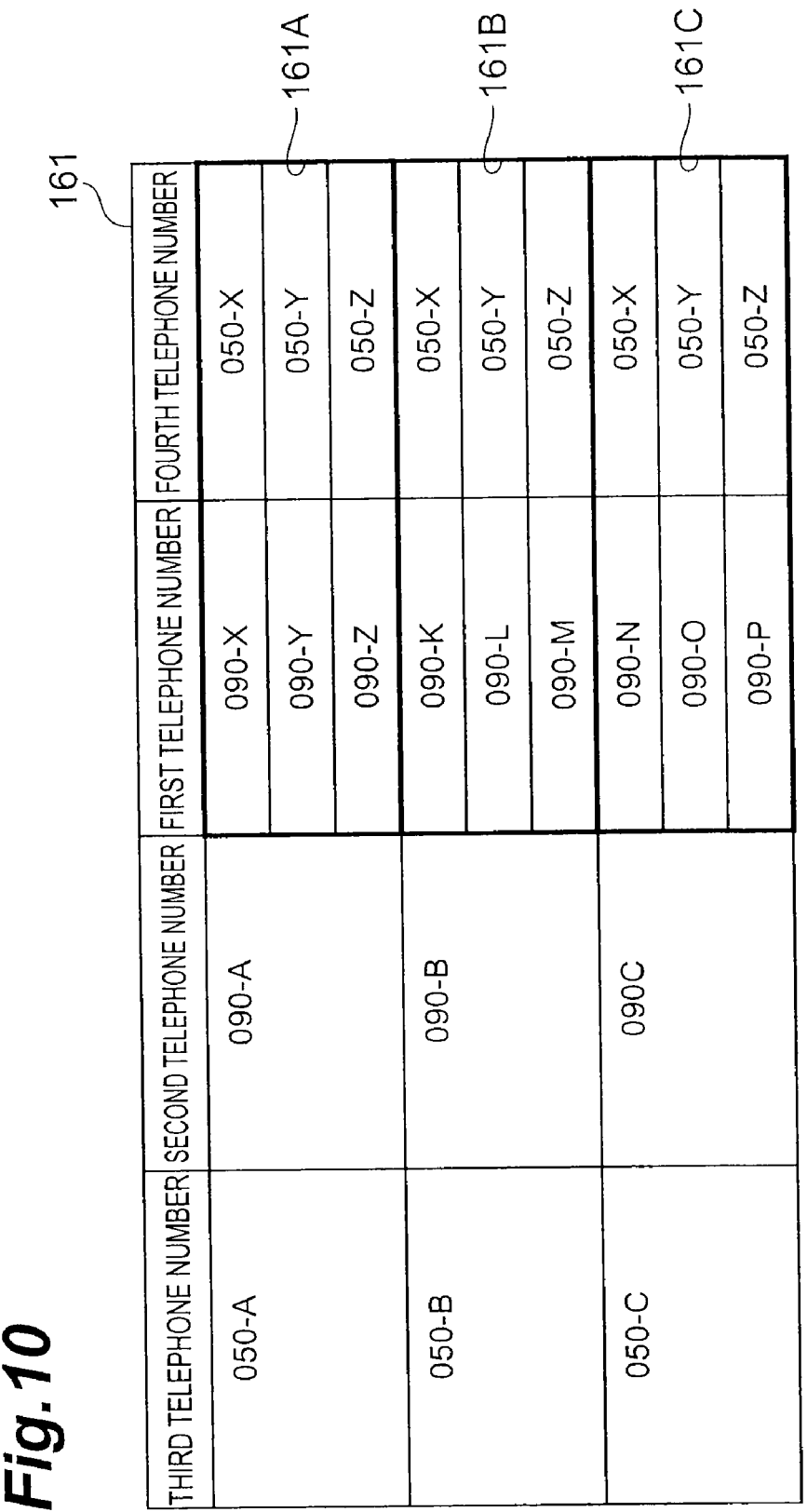
FIG. 10 is a diagram showing the structure and data examples of the number management DB.

Specifically, in the number management DB 161 shown in FIG. 10, the same numbers 050-X, 050-Y, 050-Z are redundantly set as the extension numbers associated to a fourth telephone number in three different data tables, i.e. data table 161A associated to second telephone number "090-A", data table 161B associated to second telephone number "090-B", and data table 161C associated to second telephone number "090-C".

As shown in FIG. 7, for example, in terms of hardware, the respective devices and terminals of FIG. 9 include a CPU 100A for executing an operating system, an application program or the like, a main storage unit 100B configured by ROM and RAM, an auxiliary storage unit 100C configured by a nonvolatile memory, a communication controller 100D for carrying out data communications, an output unit 100E for carrying out an information display or an information printout, and an operation unit 100F configured by keys for inputting alphanumeric characters and issuing execution instructions. Furthermore, the respective functions illustrated in FIG. 9 are realized by the CPU 100A and main storage unit 100B shown in FIG. 7 reading in a predetermined software program and executing a predetermined application, and operating the communication controller 100D under the control of the CPU 100A to carry out a data read and write from and to the main storage unit 100B and the auxiliary storage unit 100C.

(Processing Flow of This Embodiment)

Figure 13:
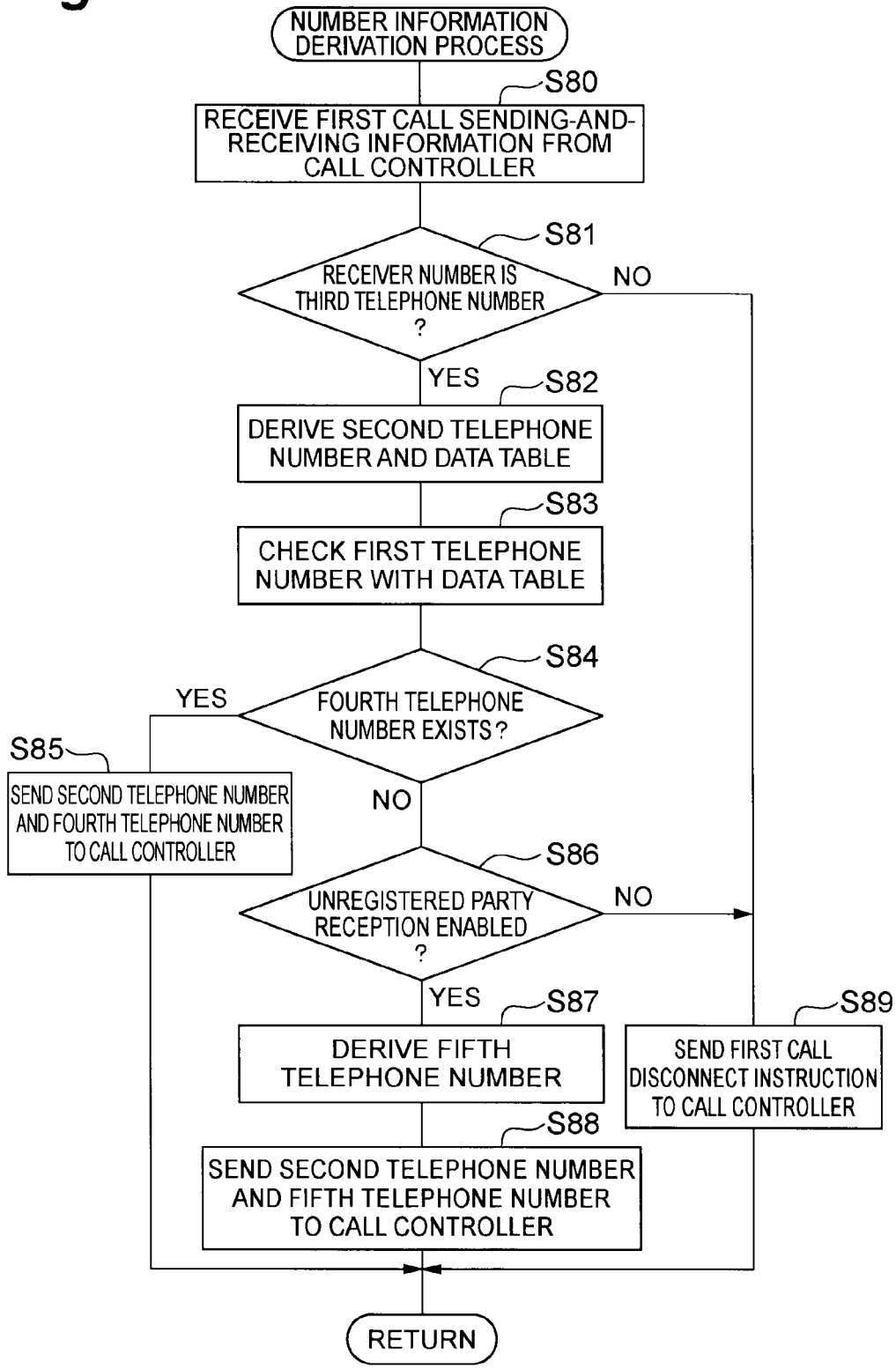
FIG. 13 is a flowchart showing a subroutine of the process for deriving number information.
Figure 14:
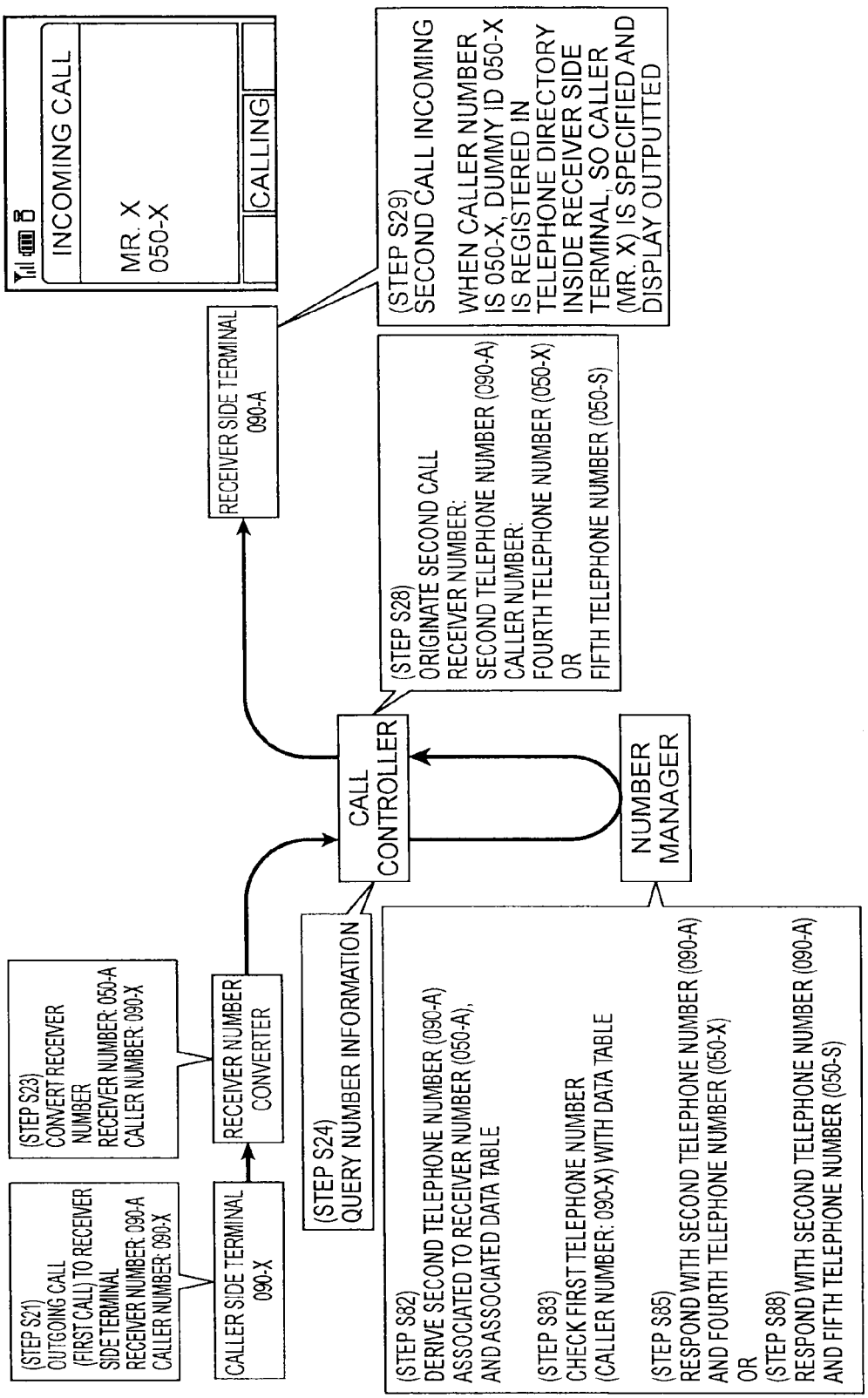
FIG. 14 is a diagram for illustrating the processing of FIG. 11.

The flow of processing executed in the communication system 2 of FIG. 9 will be explained below using FIGS. 12, 13 and 14. Specific examples of the respective telephone numbers will be explained using FIGS. 10, 11 and 14.

Figure 12:
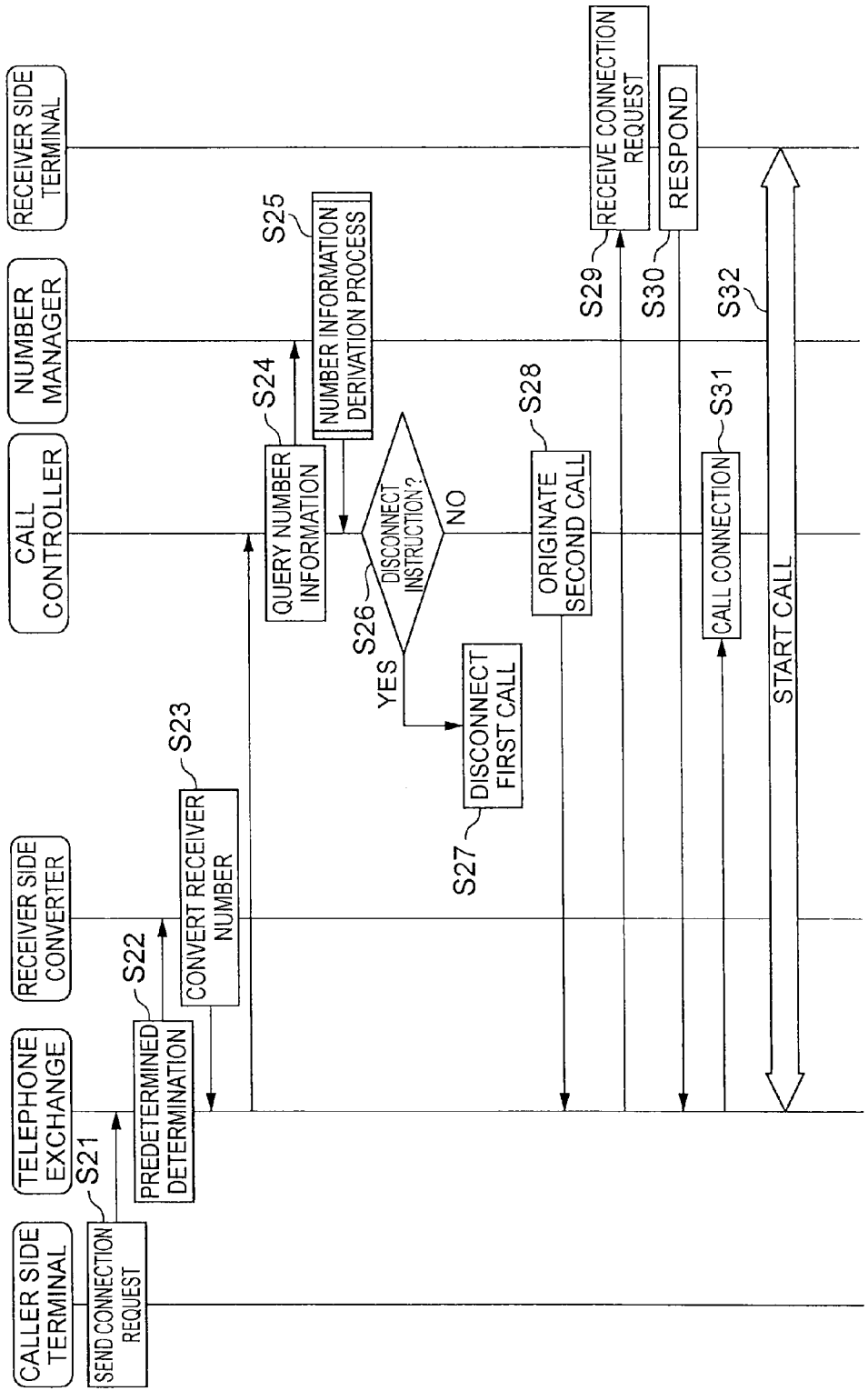
FIG. 12 is a flowchart showing the processing of the second embodiment.

First, the outgoing call part 111 of the caller side terminal 110 sends a connection request containing a first telephone number (090-X) as the caller number and a second telephone number (090-A) of the receiver number (Step S21 of FIG. 12). Then, the telephone exchange 120 nearest to the caller side terminal 110 executes a predetermined determination process for determining whether or not the receiver number (second telephone number: 090-A) is targeted for a conversion process by the receiver number converter 130 (Step S22). In this embodiment, it is supposed that the telephone number of the receiver side terminal 170 (second telephone number: 090-A) is the target of a conversion process by the receiver number converter 130. For this reason, the determination in Step S22 is that the receiver number is targeted for a conversion process by the receiver number converter 130, and the connection request from the caller side terminal 110 is transferred to the receiver number converter 130.

In the receiver number converter 130, the receiver number converting-and-sending part 131 receives the connection request from the caller side terminal 110, converts the second telephone number (090-A) to a third telephone number (050-A), and sends the post-conversion connection request containing the first telephone number (090-X) and the third telephone number (050-A) (Step S23). The post-conversion connection request is transferred to the call controller 150 inside the IP network 190 by way of a not-shown gateway.

In the call controller 150, the number querying part 151 receives the transferred connection request as a first call, and sends the received first call sending-and-receiving information to the number manager 160 to query number information associated to sending-and-receiving information (Step S24).

In the number manager 160, the execution of a number information derivation process (FIG. 13) is commenced upon receiving the above query. First, the data table deriving part 162 receives the above first call sending-and-receiving information from the call controller 150 (Step S80 of FIG. 13), and confirms that the receiver number included in the sending-and-receiving information is the third telephone number (050-A) (Step S81). At this point, if the receiver number is not the third telephone number (050-A), the data table deriving part 162 sends a first call disconnect instruction to disconnect the first call, to the call controller 150 (Step S89). As a case like this in which the receiver number is not the third telephone number (050-A), a case is assumed in which the receiver number is either a fourth telephone number (050-X) or a fifth telephone number (050-S), that is, a case in which an outgoing call is made to the caller side terminal from a lost receiver side terminal using the call register. Specifically, if an outgoing call is made to the caller side terminal from a lost receiver side terminal using the call register, since the data table deriving part 162 recognizes that the receiver number is either the fourth telephone number (050-X) or the fifth telephone number (050-S), and sends a first call disconnect instruction to the call controller, the above-mentioned outgoing call (first call) to the caller side terminal is disconnected, thereby making it possible to fully ensure security if the terminal is lost.

Conversely, when the receiver number has been confirmed to be the third telephone number (050-A) in Step S81, the data table deriving part 162, using the third telephone number (050-A) included in the sending-and-receiving information as a key, derives the second telephone number (090-A) and the data table associated to this second telephone number (Step S82). A data table including a plurality of combinations of a first telephone number and a fourth telephone number shown in FIG. 11 is derived here as the data table associated to the second telephone number (090-A) in the number management DB 161 of FIG. 10.

The checking part 163 checks the first telephone number (090-X) with the above data table (Step S83), and determines whether or not the extension associated to fourth telephone number (050-X), which is associated to the first telephone number (090-X), exists in the data table (Step S84).

When a fourth telephone number (050-X) exists in the data table here, the number sending control part 164 sends the second telephone number (090-A) and the fourth telephone number (050-X) to the call controller 150 (Step S85). Conversely, when the fourth telephone number (050-X) does not exist in the data table in Step S84, the number sending control part 164 refers to preset unregistered party reception enabled/disabled setting information, and if the setting is reception disabled to unregistered party, the number sending control part 164 sends a first call disconnect instruction to disconnect the first call, to the call controller 150 (Step S89). On the other hand, if the setting is reception enabled to unregistered party, the number sending control part 164 derives a fifth telephone number (050-S) as the dummy number for unregistered party use (Step S87), and sends the second telephone number (090-A) and the fifth telephone number (050-S) to the call controller 150 (Step S88).

In accordance with the above number information derivation process (FIG. 13), any one of (1) a first call disconnect instruction, (2) a second telephone number (090-A) and a fourth telephone number (050-X), and (3) a second telephone number (090-A) and a fifth telephone number (050-S) is sent from the number manager 160 to the call controller 150.

Returning to FIG. 12, the outgoing call control part 152 of the call controller 150 determines whether or not a first call disconnect instruction has been received from the number manager 160 (Step S26), and when the determination is that a first call disconnect instruction has been received, the outgoing call control part 152 disconnects the first call (Step S27). Conversely, when the determination in Step S26 is negative, the outgoing call control part 152 makes an outgoing call as a second call using the received telephone number as follows (Step S28). That is, when a second telephone number (090-A) and a fourth telephone number (050-X) have been received, the outgoing call control part 152 sets the fourth telephone number (050-X) as the caller number, sets the second telephone number (090-A) as the receiver number and makes an outgoing call as a second call. On the other hand, when a second telephone number (090-A) and a fifth telephone number (050-S) have been received, the outgoing call control part 152 sets the fifth telephone number (050-S) as the caller number, sets the second telephone number (090-A) as the receiver number and makes an outgoing call as a second call.

The above second call is transferred to the telephone exchange 120 inside the mobile communication network 180 by way of a not-shown gateway, and routed to the caller side terminal 170.

The connection request receiving part 171 of the receiver side terminal 170 receives, from the call controller 150, a connection request in which either a fourth telephone number (050-X) or a fifth telephone number (050-S) is set as the caller number, and the second telephone number (090-A) is set as the receiver number (Step S29). If, for example, a connection request in which the fourth telephone number (050-X), which is a dummy ID for registered party use, is set as the caller number, and the second telephone number (090-A) is set as the receiver number, is received here, and the fourth telephone number (050-X), i.e. the dummy ID, is already registered in the telephone directory inside the receiver side terminal 170, the caller (Mr. X) associated to this fourth telephone number (050-X) is specified, and the caller's name (Mr. X) and caller number (050-X) are outputted and displayed on the receiver side terminal 170 as shown in FIG. 14. The caller number outputted and displayed at this time is not the actual caller number (090-X) of the caller side terminal, but rather the dummy ID fourth telephone number (050-X).

Then, when the user of the receiver side terminal 170 responds, the responding part 172 responds to the call controller 150 (for example, sends a predetermined response signal to the call controller 150) (Step S30).

Then, upon detecting the response from the receiver side terminal 170, the call connecting part 153 of the call controller 150 connects the first call and the second call, and establishes a call connection between the caller side terminal 110 and the receiver side terminal 170 (Step S31). Consequently, a call is started between the caller side terminal 110 and the receiver side terminal 170 (Step S32).

In the above communication system of this embodiment as well, even if an outgoing call is made from a lost receiver side terminal to the caller side terminal by using the call register, the receiver number is recognized as either a fourth telephone number or a fifth telephone number, and a first call disconnect instruction is sent to the call controller the same as in the first embodiment. For this reason, the above outgoing call (first call) made to the caller side terminal is disconnected, thereby making it possible to fully ensure security if the terminal is lost.

Further, in the number management DB, the same number is redundantly set as the fourth telephone number in different data tables associated to different second telephone numbers. For this reason, it is possible to maintain outstanding scalability of the system in a situation where the total number of settable numbers is limited.

(Sending-and-Receiving Controller and Number Manager Configured as Single Device)

The call controller 150 and number manager 160 of the second embodiment may be configured by a single communication controller. The configuration of the communication controller in this case will be summarized hereinbelow.

As shown in FIG. 15, a communication controller 200 that integrates the call controller 150 and the number manager 160 of FIG. 9 is disposed inside the IP network 190 of communication system 2. The functional block configuration of this communication controller 200, for example, may be configured as follows. That is, the communication controller 200 includes a connection request receiving part 201, a number management DB 202, a data table deriving part 203, a checking part 204, a number output control part 205, an outgoing call control part 206, and a call connecting part 207. The functions of the respective components are as follows.

Subsequent to a second telephone number being converted to a third telephone number by the receiver number converter relative to a connection request containing a first telephone number and the second telephone number having been sent from the caller side terminal as a first call, the connection request receiving part 201 receives the post-conversion connection request containing the first telephone number and the third telephone number.

The number management DB 202, using the third telephone number as a key, associatively stores a third telephone number and a second telephone number, and a data table including a plurality of combinations of a first telephone number and a fourth telephone number. The configuration is the same as that of the number management DB shown in FIGS. 9 and 10.

The data table deriving part 203, using the third telephone number included in the post-conversion connection request as a key, derives the second telephone number and the data table associated to this second telephone number. This data table deriving part 203 has the same function as that of the data table deriving part 162 of FIG. 9.

The checking part 204 checks the first telephone number with the above data table the same as the checking part 163 of FIG. 9.

The number output control part 205 outputs the second telephone number and the fourth telephone number when this fourth telephone number, which is associated to the first telephone number, exists in the above data table. The number output control part 205 either outputs a first call disconnect instruction or outputs the second telephone number and a fifth telephone number in accordance with unregistered party reception enabled/disabled setting information for showing reception enabled/disabled to an unregistered party when the fourth telephone number does not exist in the above data table.

The outgoing call control part 206 disconnects the first call when a first call disconnect instruction has been outputted, sets a fourth telephone number as the caller number, sets a second telephone number as the receiver number and makes an outgoing call as a second call when the second telephone number and the fourth telephone number have been outputted. The outgoing call control part 206 sets a fifth telephone number as the caller number, sets a second telephone number as the receiver number and makes an outgoing call as the second call when the second telephone number and the fifth telephone number have been outputted.

The call connecting part 207 connects the first call and the second call in response to a response from the receiver side terminal, and establishes a call connection between the caller side terminal and the receiver side terminal in the same way by the call connecting part 153 of FIG. 9.

This communication controller 200 is configured such that, when a determination has been made that the receiver number in the sending-and-receiving information of the first call is either a fourth telephone number or a fifth telephone number, the data table deriving part 203 outputs a first call disconnect instruction to the call controller. Consequently, even if a call is made to the caller side terminal from a lost receiver side terminal using the call register, the data table deriving part 203 recognizes that the receiver number is either a fourth telephone number or a fifth telephone number, and sends a first call disconnect instruction to the call controller. For this reason, the above-mentioned outgoing call (first call) to the caller side terminal is disconnected, thereby making it possible to fully ensure security if the terminal is lost.

Further, in the number management DB 202, the same number is redundantly set as the fourth telephone number in different data tables associated to different second telephone numbers. For this reason, it is possible to maintain outstanding scalability of the system in a situation where the total number of settable numbers is limited.

The disclosure of Japanese Patent Application No. 2008-107116 filed on Apr. 16, 2008 including specification, drawings and claims is incorporated herein by reference in its entirety.

What is claimed is:

1. A communication control method for a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the communication control method comprising:

a step, by a caller side terminal, of sending a connection request including a first telephone number and a second telephone number;

a step, by a receiver number converter, of receiving the connection request sent from the caller side terminal, converting the second telephone number to a third telephone number, and sending a post-conversion connection request including the first telephone number and the third telephone number;

a step, by an extension number converter, of receiving the connection request sent from the receiver number converter, converting the third telephone number to an extension number associated to this third telephone number, and sending a post-conversion connection request including the first telephone number and the extension number associated to the third telephone number;

a step, by the call controller, of receiving the connection request sent from the extension number converter as a first call, and sending sending-and-receiving information of the received first call to a number manager to query number information associated to the sending-and-receiving information;

a step, by the number manager, of receiving the first call sending-and-receiving information from the call controller, and deriving a second telephone number and a data table associated to this second telephone number by using an extension number associated to a third telephone number included in the first call sending-and-receiving information as a key, the number manager comprising a number management database that associatively stores an extension number associated to a third telephone number and a second telephone number, and the data table comprising a plurality of combinations of a first telephone number and an extension number associated to a fourth telephone number, by using the extension number associated to the third telephone number as a key;

a step, by the number manager, of checking the first telephone number with this data table;

a step, by the number manager, of sending the second telephone number and an extension number associated to the fourth telephone number to the call controller when the extension number associated to this fourth telephone number, which is associated to the first telephone number, exists in the data table, and of either sending an instruction to disconnect the first call to the call controller or sending, to the call controller, the second telephone number and an extension number associated to a fifth telephone number in accordance with unregistered party reception enabled/disabled setting information for showing reception enabled/disabled to an unregistered party when the extension number associated to the fourth telephone number does not exist in the data table;

a step, by the call controller, of disconnecting the first call upon receiving the first call disconnect instruction, and of setting an extension number associated to the fourth telephone number as the caller number, setting the second telephone number as the receiver number and making an outgoing call as a second call upon receiving the second telephone number and the extension number associated to the fourth telephone number, and of setting an extension number associated to the fifth telephone number as the caller number, setting the second telephone number as the receiver number and making an outgoing call as a second call upon receiving the second telephone number and the extension number associated to the fifth telephone number;

a step, by the extension number converter, of either converting the extension number associated to a fourth telephone number that has been set as the caller number of this connection request to a fourth telephone number and sending a connection request in which this fourth telephone number is set as the caller number, or converting the extension number associated to a fifth telephone number that has been set as the caller number of this connection request to a fifth telephone number and sending a connection request in which this fifth telephone number is set as the caller number, subsequent to receiving the second call connection request from the call controller;

a step, by the receiver side terminal, of receiving the connection request in which either the fourth telephone number or the fifth telephone number is set as the caller number, and the second telephone number is set as the receiver number, from the extension number converter;

a step, by the receiver side terminal, of responding to the received connection request; and a step, by the call controller, of connecting the first call and the second call in response to a response from the receiver side terminal, thereby establishing a call connection between the caller side terminal and the receiver side terminal, wherein, when the number manager determines that the receiver number in the sending-and-receiving information of the first call received from the call controller is either an extension number associated to the fourth telephone number or an extension number associated to the fifth telephone number, the number manager sends a first call disconnect instruction to the call controller, and the same number is redundantly set as the extension number associated to the fourth telephone number in different data tables associated to different second telephone numbers.

2. A communication system, which comprises a caller side terminal, a receiver number converter, an extension number converter, a call controller, a number manager, and a receiver side terminal, and which is configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the caller side terminal comprising an outgoing call part for sending a connection request containing a first telephone number and a second telephone number;

the receiver number converter comprising a receiver number converting-and-sending part for receiving a connection request sent from the caller side terminal, converting the second telephone number to a third telephone number, and sending a post-conversion connection request containing the first telephone number and the third telephone number;

the extension number converter comprising:

a converting-and-sending part for receiving the connection request sent from the receiver number converter, converting the third telephone number to an extension number associated to this third telephone number, and sending a post-conversion connection request containing the first telephone number and the extension number associated to the third telephone number; and a reverse converting-and-sending part for, subsequent to receiving the second call connection request from the call controller, either converting the extension number associated to a fourth telephone number that has been set as the caller number of this connection request to the fourth telephone number and sending a connection request in which this fourth telephone number is set as the caller number, or converting the extension number associated to the fifth telephone number that has been set as the caller number of this connection request to the fifth telephone number and sending a connection request in which this fifth telephone number is set as the caller number;

the call controller comprising:

a number query part for receiving as a first call the connection request sent from the extension number converter and sending sending-and-receiving information of this received first call to the number manager to query number information associated to the sending-and-receiving information;

an outgoing call control part for disconnecting the first call upon receiving the first call disconnect instruction, for setting an extension number associated to the fourth telephone number as the caller number, setting the second telephone number as the receiver number and making an outgoing call as a second call upon receiving the second telephone number and the extension number associated to the fourth telephone number, and for setting an extension number associated to the fifth telephone number as the caller number, setting the second telephone number as the receiver number and making an outgoing call as a second call upon receiving the second telephone number and the extension number associated to the fifth telephone number; and a call connecting part for connecting the first call and the second call in response to a response from the receiver side terminal to establish a call connection between the caller side terminal and the receiver side terminal;

the number manager comprising:

a number management database for associatively storing an extension number associated to a third telephone number and a second telephone number, and a data table comprising a plurality of combinations of a first telephone number and an extension number associated to a fourth telephone number, by using the extension number associated to the third telephone number as a key;

a data table deriving part for receiving the first call sending-and-receiving information from the call controller, and deriving a second telephone number and the data table associated to this second telephone number by using the extension number associated to the third telephone number included in the first call sending-and-receiving information as a key;

a checking part for checking the first telephone number with this data table; and a number sending control part for sending, to the call controller, the second telephone number and an extension number associated to the fourth telephone number when the extension number associated to this fourth telephone number, which is associated to the first telephone number, exists in the data table, and for either sending an instruction to disconnect the first call to the call controller or sending, to the call controller, the second telephone number and an extension number associated to a fifth telephone number in accordance with unregistered party reception enabled/disabled setting information for showing reception enabled/disabled to an unregistered party when the extension number associated to the fourth telephone number does not exist in the data table; and the receiver side terminal comprising:

a connection request receiving part for receiving, from the extension number converter, the connection request in which either the fourth telephone number or the fifth telephone number is set as the caller number, and the second telephone number is set as the receiver number; and a responding part for responding to the received connection request, wherein, when the receiver number in the sending-and-receiving information of the first call received from the call controller is either an extension number associated to the fourth telephone number or an extension number associated to the fifth telephone number, the data table deriving part sends a first call disconnect instruction to the call controller; and the same number is redundantly set as the extension number associated to the fourth telephone number in different data tables associated to different second telephone numbers.

3. A communication controller that resides inside a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to its own communication controller, the communication controller comprising:

a connection request receiving part for receiving a post-conversion connection request containing the first telephone number and the extension number associated to the third telephone number, subsequent to a second telephone number being converted to a third telephone number by a receiver number converter and the third telephone number being converted to an extension number associated to this third telephone number by an extension number converter relative to a connection request containing a first telephone number and the second telephone number sent from the caller side terminal as a first call;

a number management database for associatively storing an extension number associated to a third telephone number and a second telephone number, and a data table comprising a plurality of combinations of a first telephone number and an extension number associated to a fourth telephone number, by using the extension number associated to the third telephone number as a key;

a data table deriving part for deriving a second telephone number and the data table associated to this second telephone number by using the extension number associated to the third telephone number included in the post-conversion connection request as a key;

a checking part for checking the first telephone number with this data table;

a number output control part for outputting the second telephone number and an extension number associated to the fourth telephone number when the extension number associated to this fourth telephone number, which is associated to the first telephone number, exists in the data table, and for either outputting an instruction to disconnect the first call or outputting the second telephone number and an extension number associated to a fifth telephone number in accordance with unregistered party reception enabled/disabled setting information for showing reception enabled/disabled to an unregistered party when the extension number associated to the fourth telephone number does not exist in the data table;

an outgoing call control part for disconnecting the first call when the first call disconnect instruction is outputted, for setting an extension number associated to the fourth telephone number as the caller number, setting the second telephone number as the receiver number and making an outgoing call as a second call when the second telephone number and the extension number associated to the fourth telephone number are outputted, and for setting an extension number associated to the fifth telephone number as the caller number, setting the second telephone number as the receiver number and making an outgoing call as a second call when the second telephone number and the extension number associated to the fifth telephone number are outputted; and a call connecting part for connecting the first call and the second call in response to a response from the receiver side terminal to establish a call connection between the caller side terminal and the receiver side terminal, wherein, when the data table deriving part determines that the receiver number in the first call sending-and-receiving information is either the extension number associated to the fourth telephone number or the extension number associated to the fifth telephone number, the data table deriving part outputs a first call disconnect instruction to the outgoing call control part; and the same number is redundantly set as the extension number associated to the fourth telephone number in different data tables associated to different second telephone numbers.

4. A communication control method for a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the communication control method comprising:

a step, by a caller side terminal, of sending a connection request including a first telephone number and a second telephone number;

a step, by a receiver number converter, of receiving the connection request sent from the caller side terminal, converting the second telephone number to a third telephone number, and sending a post-conversion connection request including the first telephone number and the third telephone number;

a step, by the call controller, of receiving the connection request sent from the receiver number converter as a first call, and sending sending-and-receiving information of the received first call to a number manager to query number information associated to the sending-and-receiving information;

a step, by the number manager, of receiving the first call sending-and-receiving information from the call controller, and deriving a second telephone number and a data table associated to this second telephone number by using a third telephone number included in the first call sending-and-receiving information as a key, the number manager comprising a number management database that associatively stores the third telephone number and a second telephone number, and the data table comprising a plurality of combinations of a first telephone number and a fourth telephone number, by using the third telephone number as a key;

a step, by the number manager, of checking the first telephone number with this data table;

a step, by the number manager, of sending the second telephone number and the fourth telephone number to the call controller when this fourth telephone number, which is associated to the first telephone number, exists in the data table, and of either sending an instruction to disconnect the first call to the call controller or sending, to the call controller, the second telephone number and a fifth telephone number in accordance with unregistered party reception enabled/disabled setting information for showing reception enabled/disabled to an unregistered party when the fourth telephone number does not exist in the data table;

a step, by the call controller, of disconnecting the first call upon receiving the first call disconnect instruction, of setting the fourth telephone number as the caller number, setting the second telephone number as the receiver number and making an outgoing call as a second call upon receiving the second telephone number and the fourth telephone number, and of setting the fifth telephone number as the caller number, setting the second telephone number as the receiver number and making an outgoing call as a second call upon receiving the second telephone number and the fifth telephone number;

a step, by the receiver side terminal, of receiving the connection request in which either the fourth telephone number or the fifth telephone number is set as the caller number, and the second telephone number is set as the receiver number, from the call controller;

a step, by the receiver side terminal, of responding to the received connection request; and a step, by the call controller, of connecting the first call and the second call in response to a response from the receiver side terminal, thereby establishing a call connection between the caller side terminal and the receiver side terminal, wherein, when the number manager determines that the receiver number in the sending-and-receiving information of the first call received from the call controller is either the fourth telephone number or the fifth telephone number, the number manager sends a first call disconnect instruction to the call controller; and the same number is redundantly set as the fourth telephone number in different data tables associated to different second telephone numbers.

5. A communication system, which comprises a caller side terminal, a receiver number converter, a call controller, a number manager, and a receiver side terminal, and which is configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to a call controller, the caller side terminal comprising an outgoing call part for sending a connection request containing a first telephone number and a second telephone number;

the receiver number converter comprising a receiver number converting-and-sending part for receiving a connection request sent from the caller side terminal, converting the second telephone number to a third telephone number, and sending a post-conversion connection request containing the first telephone number and the third telephone number;

the call controller comprising:

a number query part for receiving as a first call the connection request sent from the receiver number converter and sending sending-and-receiving information of this received first call to the number manager to query number information associated to the sending-and-receiving information;

an outgoing call control part for disconnecting the first call upon receiving the first call disconnect instruction, for setting the fourth telephone number as the caller number, setting the second telephone number as the receiver number and making an outgoing call as a second call upon receiving the second telephone number and the fourth telephone number, and for setting the fifth telephone number as the caller number, setting the second telephone number as the receiver number and making an outgoing call as a second call upon receiving the second telephone number and the fifth telephone number; and a call connecting part for connecting the first call and the second call in response to a response from the receiver side terminal to establish a call connection between the caller side terminal and the receiver side terminal;

the number manager comprising:

a number management database for associatively storing a third telephone number and a second telephone number, and a data table comprising a plurality of combinations of a first telephone number and a fourth telephone number, by using the third telephone number as a key;

a data table deriving part for receiving the first call sending-and-receiving information from the call controller, and deriving a second telephone number and the data table associated to this second telephone number by using the third telephone number included in the first call sending-and-receiving information as a key;

a checking part for checking the first telephone number with this data table; and a number sending control part for sending the second telephone number and the fourth telephone number to the call controller when this fourth telephone number, which is associated to the first telephone number, exists in the data table, and for either sending an instruction to disconnect the first call to the call controller or sending, to the call controller, the second telephone number and a fifth telephone number in accordance with unregistered party reception enabled/disabled setting information for showing reception enabled/disabled to an unregistered party when the fourth telephone number does not exist in the data table; and the receiver side terminal comprising:

a connection request receiving part for receiving the connection request in which either the fourth telephone number or the fifth telephone number is set as the caller number, and the second telephone number is set as the receiver number, from the call controller; and a responding part for responding to the received connection request, wherein, when the receiver number in the sending-and-receiving information of the first call received from the call controller is either the fourth telephone number or the fifth telephone number, the data table deriving part sends a first call disconnect instruction to the call controller; and the same number is redundantly set as the fourth telephone number in different data tables associated to different second telephone numbers.

6. A communication controller that resides inside a communication system configured such that there exist a first telephone number as a caller number, a second telephone number as a receiver number, a third telephone number that has been pre-associated to the second telephone number, a fourth telephone number as a dummy number that has been pre-associated to the first telephone number, and a fifth telephone number as a dummy number for unregistered party use, and such that a connection request, which has any of the third telephone number, the fourth telephone number and the fifth telephone number as the caller number, is routed to its own communication controller, the communication controller comprising:

a connection request receiving part for receiving a post-conversion connection request containing a first telephone number and a third telephone number, subsequent to a second telephone number being converted to the third telephone number by a receiver number converter relative to a connection request containing the first telephone number and the second telephone number sent from a caller side terminal as a first call;

a number management database for associatively storing a third telephone number, a second telephone number, and a data table comprising a plurality of combinations of a first telephone number and a fourth telephone number by using the third telephone number as a key;

a data table deriving part for deriving a second telephone number and the data table associated to this second telephone number by using the third telephone number included in the post-conversion connection request as a key;

a checking part for checking the first telephone number with this data table;

a number output control part for outputting the second telephone number and the fourth telephone number when this fourth telephone number, which is associated to the first telephone number, exists in the data table, and for either outputting an instruction to disconnect the first call or outputting the second telephone number and a fifth telephone number in accordance with unregistered party reception enabled/disabled setting information for showing reception enabled/disabled to an unregistered party when the fourth telephone number does not exist in the data table;

an outgoing call control part for disconnecting the first call when the first call disconnect instruction is outputted, for setting the fourth telephone number as the caller number, setting the second telephone number as the receiver number and making an outgoing call as a second call when the second telephone number and the fourth telephone number are outputted, and for setting the fifth telephone number as the caller number, setting the second telephone number as the receiver number and making an outgoing call as a second call when the second telephone number and the fifth telephone number are outputted; and a call connecting part for connecting the first call and the second call in response to a response from the receiver side terminal to establish a call connection between the caller side terminal and the receiver side terminal, wherein, when the data table deriving part determines that the receiver number in the first call sending-and-receiving information is either the fourth telephone number or the fifth telephone number, the data table deriving part outputs a first call disconnect instruction to the outgoing call control part; and the same number is redundantly set as the fourth telephone number in different data tables associated to different second telephone numbers.

7. The communication system according to claim 2, wherein the setting of the unregistered party reception enabled/disabled setting information can be changed.

8. The communication system according to claim 5, wherein the setting of the unregistered party reception enabled/disabled setting information can be changed.

* * * * *